US009495966B2

(12) United States Patent
Levien et al.

(10) Patent No.: US 9,495,966 B2
(45) Date of Patent: Nov. 15, 2016

(54) SPEECH RECOGNITION ADAPTATION SYSTEMS BASED ON ADAPTATION DATA

(75) Inventors: Royce A. Levien, Lexington, MA (US); Richard T. Lord, Tacoma, WA (US); Robert W. Lord, Seattle, WA (US); Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 276 days.

(21) Appl. No.: 13/538,855

(22) Filed: Jun. 29, 2012

(65) Prior Publication Data
US 2013/0325446 A1  Dec. 5, 2013

Related U.S. Application Data

(63) Continuation-in-part of application No. 13/485,733, filed on May 31, 2012, and a continuation-in-part of application No. 13/485,738, filed on May 31, 2012.

(51) Int. Cl.
| G10L 15/06 | (2013.01) |
| G10L 15/30 | (2013.01) |
| G10L 15/07 | (2013.01) |
| G10L 15/065 | (2013.01) |

(52) U.S. Cl.
CPC ............... *G10L 15/30* (2013.01); *G10L 15/06* (2013.01); *G10L 15/07* (2013.01); *G10L 15/063* (2013.01); *G10L 15/065* (2013.01)

(58) Field of Classification Search
CPC .. G10L 15/06; G10L 15/063; G10L 15/0655
USPC ................................................ 704/200–504
See application file for complete search history.

(56) References Cited

U.S. PATENT DOCUMENTS

| 5,214,615 | A | 5/1993 | Bauer |
| 6,006,183 | A | 12/1999 | Lai et al. |
| 6,493,506 | B1 * | 12/2002 | Schoner et al. ............... 386/334 |
| 6,823,306 | B2 * | 11/2004 | Reding et al. ................ 704/244 |
| 7,099,825 | B1 | 8/2006 | Cook |

(Continued)

FOREIGN PATENT DOCUMENTS

| EP | 1 205 906 A1 | 5/2002 |
| EP | 2 405 422 A1 | 1/2012 |

OTHER PUBLICATIONS

Yuasa et al., "Operating Networked Appliances Using Gaze Information and Voice Recognition", Proceedings of the Third IASTED International Conference, Human-Computer Interaction, Mar. 2008.*

(Continued)

*Primary Examiner* — Samuel G Neway

(57) ABSTRACT

The instant application includes computationally-implemented systems and methods that include acquiring indication of a speech-facilitated transaction between a particular party and a target device, receiving adaptation data correlated to the particular party, the receiving facilitated by a particular device associated with the particular party, processing audio data from the particular party at least partly using the received adaptation data correlated to the particular party, and updating the adaptation data based at least in part on a result of the processed audio data, such that the updated adaptation data is configured to be transmitted to the particular device. In addition to the foregoing, other aspects are described in the claims, drawings, and text.

44 Claims, 35 Drawing Sheets

(56) References Cited

U.S. PATENT DOCUMENTS

| | | |
|---|---|---|
| 7,162,414 B2 | 1/2007 | Stanford |
| 7,174,298 B2 * | 2/2007 | Sharma ..................... 704/270.1 |
| 7,191,133 B1 | 3/2007 | Pettay |
| 7,194,409 B2 | 3/2007 | Balentine et al. |
| 7,219,058 B1 | 5/2007 | Rose et al. |
| 7,243,070 B2 * | 7/2007 | Hoffmann et al. ........... 704/251 |
| 7,346,151 B2 | 3/2008 | Erhart et al. |
| 7,660,715 B1 | 2/2010 | Thambiratnam |
| 7,949,529 B2 | 5/2011 | Weider et al. |
| 8,032,383 B1 * | 10/2011 | Bhardwaj et al. ............ 704/275 |
| 8,082,147 B2 * | 12/2011 | Parthasarathy et al. ...... 704/231 |
| 8,374,867 B2 * | 2/2013 | Ljolje et al. .................. 704/244 |
| 8,843,371 B2 | 9/2014 | Levien et al. |
| 2002/0019734 A1 | 2/2002 | Bartosik |
| 2002/0065656 A1 | 5/2002 | Reding et al. |
| 2002/0091511 A1 * | 7/2002 | Hellwig et al. ............... 704/201 |
| 2002/0138265 A1 | 9/2002 | Stevens et al. |
| 2002/0138274 A1 * | 9/2002 | Sharma et al. ................ 704/270 |
| 2002/0147579 A1 | 10/2002 | Kushner et al. |
| 2002/0188446 A1 | 12/2002 | Gao et al. |
| 2003/0050783 A1 * | 3/2003 | Yoshizawa ................. 704/270.1 |
| 2003/0088421 A1 | 5/2003 | Maes et al. |
| 2003/0191639 A1 | 10/2003 | Mazza |
| 2004/0064316 A1 * | 4/2004 | Gallino ......................... 704/251 |
| 2004/0088162 A1 * | 5/2004 | He et al. ....................... 704/235 |
| 2004/0158457 A1 * | 8/2004 | Veprek et al. ................ 704/201 |
| 2004/0176953 A1 | 9/2004 | Coyle et al. |
| 2004/0199388 A1 | 10/2004 | Armbruster et al. |
| 2005/0049868 A1 * | 3/2005 | Busayapongchai ........... 704/251 |
| 2005/0058435 A1 * | 3/2005 | Chung et al. .................... 386/95 |
| 2005/0152565 A1 | 7/2005 | Jouppi et al. |
| 2007/0136069 A1 | 6/2007 | Veliu et al. |
| 2007/0233487 A1 | 10/2007 | Cohen et al. |
| 2008/0015848 A1 | 1/2008 | Arizmendi et al. |
| 2008/0082332 A1 * | 4/2008 | Mallett et al. ................ 704/250 |
| 2009/0043582 A1 * | 2/2009 | Zhou et al. ................... 704/257 |
| 2009/0063144 A1 | 3/2009 | Rose et al. |
| 2009/0265217 A1 | 10/2009 | Aurenz |
| 2009/0290689 A1 | 11/2009 | Watanabe et al. |
| 2010/0086108 A1 | 4/2010 | Jaiswal et al. |
| 2010/0283829 A1 | 11/2010 | De Beer et al. |
| 2011/0029307 A1 | 2/2011 | Parthasarathy et al. |
| 2011/0119059 A1 | 5/2011 | Ljolje et al. |
| 2011/0288863 A1 | 11/2011 | Rasmussen |
| 2012/0010887 A1 * | 1/2012 | Boregowda et al. ......... 704/250 |
| 2012/0014568 A1 | 1/2012 | Conwell et al. |
| 2013/0325441 A1 * | 12/2013 | Levien et al. ..................... 704/9 |
| 2013/0325446 A1 * | 12/2013 | Levien et al. ................ 704/201 |
| 2013/0325447 A1 * | 12/2013 | Levien et al. ................ 704/201 |
| 2013/0325448 A1 * | 12/2013 | Levien et al. ................ 704/201 |
| 2013/0325449 A1 * | 12/2013 | Levien et al. ................ 704/201 |
| 2013/0325450 A1 * | 12/2013 | Levien et al. ................ 704/201 |
| 2013/0325451 A1 * | 12/2013 | Levien et al. ................ 704/201 |
| 2013/0325452 A1 * | 12/2013 | Levien et al. ................ 704/201 |
| 2013/0325453 A1 * | 12/2013 | Levien et al. ................ 704/201 |
| 2013/0325454 A1 * | 12/2013 | Levien et al. ................ 704/201 |
| 2013/0325459 A1 * | 12/2013 | Levien et al. ................ 704/231 |
| 2013/0325474 A1 * | 12/2013 | Levien et al. ................ 704/251 |
| 2014/0039881 A1 * | 2/2014 | Levien et al. ................ 704/201 |
| 2014/0039882 A1 * | 2/2014 | Levien et al. ................ 704/201 |

OTHER PUBLICATIONS

PCT International Search Report; International App. No. PCT/US13/48640; Jan. 14, 2014; pp. 1-2.

European Patent Office, Supplementary European Search Report, Pursuant to Rule 62 EPC; App. No. EP 13808577; Jan. 19, 2016 (received by our Agent on Jan. 25, 2016); pp. 1-2.

* cited by examiner

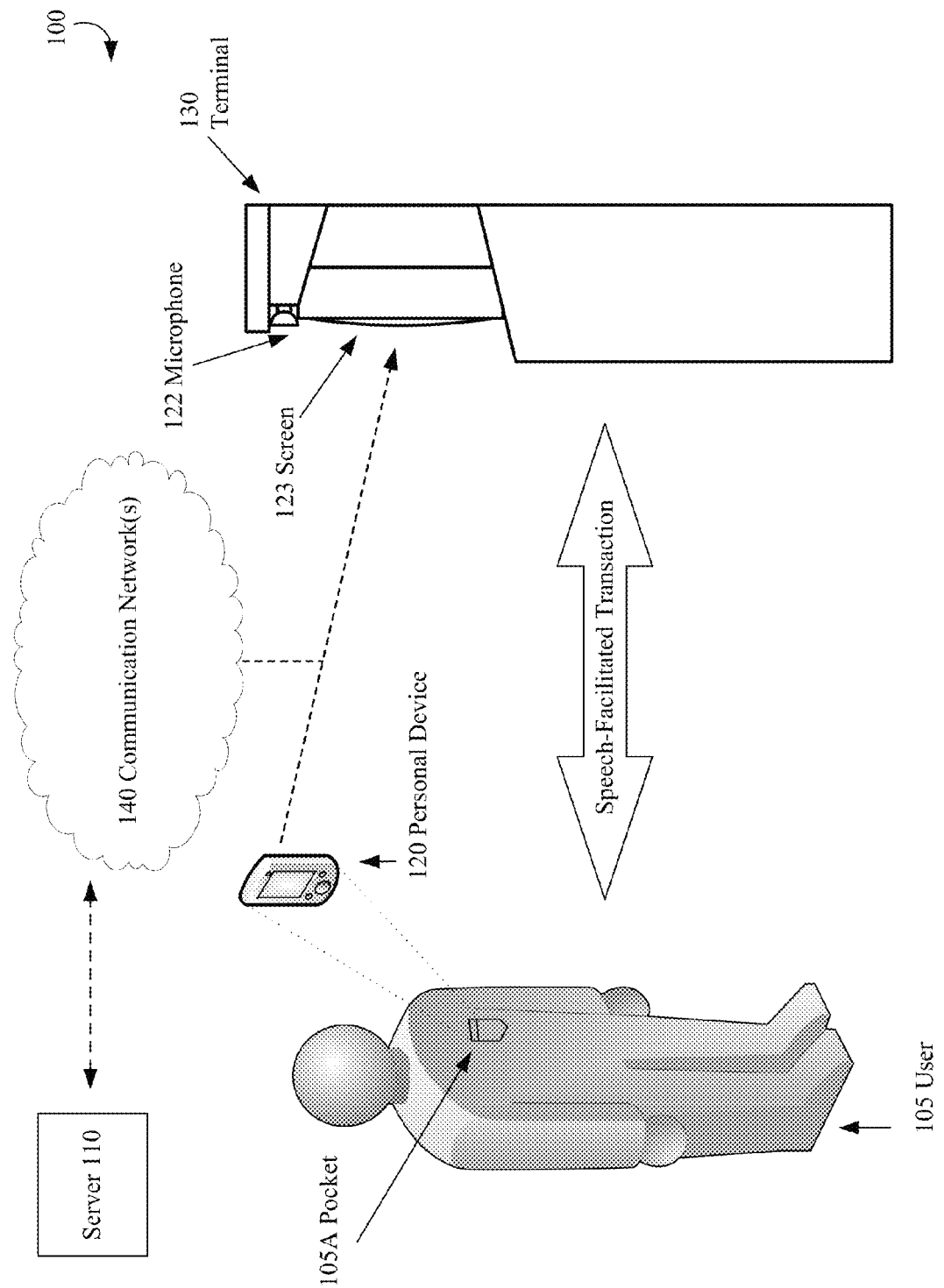

152 Speech-facilitated Transaction Initiation Between Particular Party And Target Device Indicator Acquiring Module 202 Speech-facilitated Transaction Between Motor Vehicle And Driver Indicator Acquiring Module 204 Issued Speech Command From Driver To Motor Vehicle Indicator Acquiring Module 206 Issued Speech Command From Driver To Motor Vehicle Instructing Motor Vehicle Mirror Adjustment Indicator Acquiring Module 208 Issued Speech Command From Driver To Motor Vehicle Instructing Motor Vehicle Mirror Adjustment Indicator Acquiring From Speech Detecting Module 210 Transaction At Least Partly Using Speech Initiation Between Particular Party And Target Device Indicator Acquiring Module 212 Transaction At Least Partly Using Speech And Partly Using Device Portion Interaction Initiation Between Particular Party And Target Device Indicator Acquiring Module 214 Particular Party And Target Device Interaction Indication Acquiring Module 216 Particular Party And Target Device Other Than Speech Interaction Indication Acquiring Module

| Fig. 2A | Fig. 2B | Fig. 2C | Fig. 2D |

152 Speech-facilitated Transaction Initiation Between Particular Party And Target Device Indicator Acquiring Module 218 Particular Party And Target Device Particular Proximity Indication Acquiring Module 220 Particular Party And Particular Device Particular Proximity Indication Acquiring Module 222 Particular Party And Particular Device Particular Proximity And Particular Device And Target Device Further Proximity Indication Acquiring Module 224 Particular Party And Key Ring Particular Proximity And Key Ring And Motor Vehicle Further Proximity Indication Acquiring Module 226 Particular Party And Remote Control Particular Proximity And Remote Control And Speech-controlled Optical Disc Player Further Proximity Indication Acquiring Module 228 Particular Party And Smartphone Particular Proximity And Smartphone And Automated Grocery Checkout Line Device Further Proximity Indication Acquiring Module

Fig. 2

| Fig. 2A | Fig. 2B | Fig. 2C | Fig. 2D |

FIG. 2B

152 Speech-facilitated Transaction Initiation Between Particular Party And Target Device Indicator Acquiring Module

230 Particular Party Speaking To Target Device Indicator Acquiring Module

252 Particular Party Speaking To Target Device Indicator Based On An Orientation Of A Particular Party Body Part Acquiring Module

| 254 Particular Party Speaking To Target Device Indicator Based On A Head Orientation Acquiring Module | 256 Particular Party Speaking To Target Device Indicator Based On A Shoulder Orientation Acquiring Module |

Fig. 2

| Fig. 2A | Fig. 2B | Fig. 2C | Fig. 2D |

FIG. 2D

154 Particular Party-correlated Adaptation Data Receiving Facilitated By Particular Party Associated Particular Device Module 302 Particular Party-correlated Adaptation Data Receiving From Particular Device Module 304 Particular Party-correlated Adaptation Data Comprising Particular Party Speech Characteristics, Adaptation Data Location Receiving From Particular Device Module 306 Particular Party-correlated Adaptation Data Comprising Particular Party Speech Characteristics, Adaptation Data Reception Instruction Receiving From Particular Device Module 308 Particular Party Speech Characteristic Receiving Facilitated By Particular Party Associated Particular Device Module 310 Particular Party Instruction For Adapting A Speech Recognition Module Receiving Facilitated By Particular Party Associated Particular Device Module 312 Particular Party Phoneme Pronunciation Concept Linking Data Receiving Facilitated By Particular Party Associated Particular Device Module

Fig. 3

| Fig. 3A | Fig. 3B |

FIG. 3A

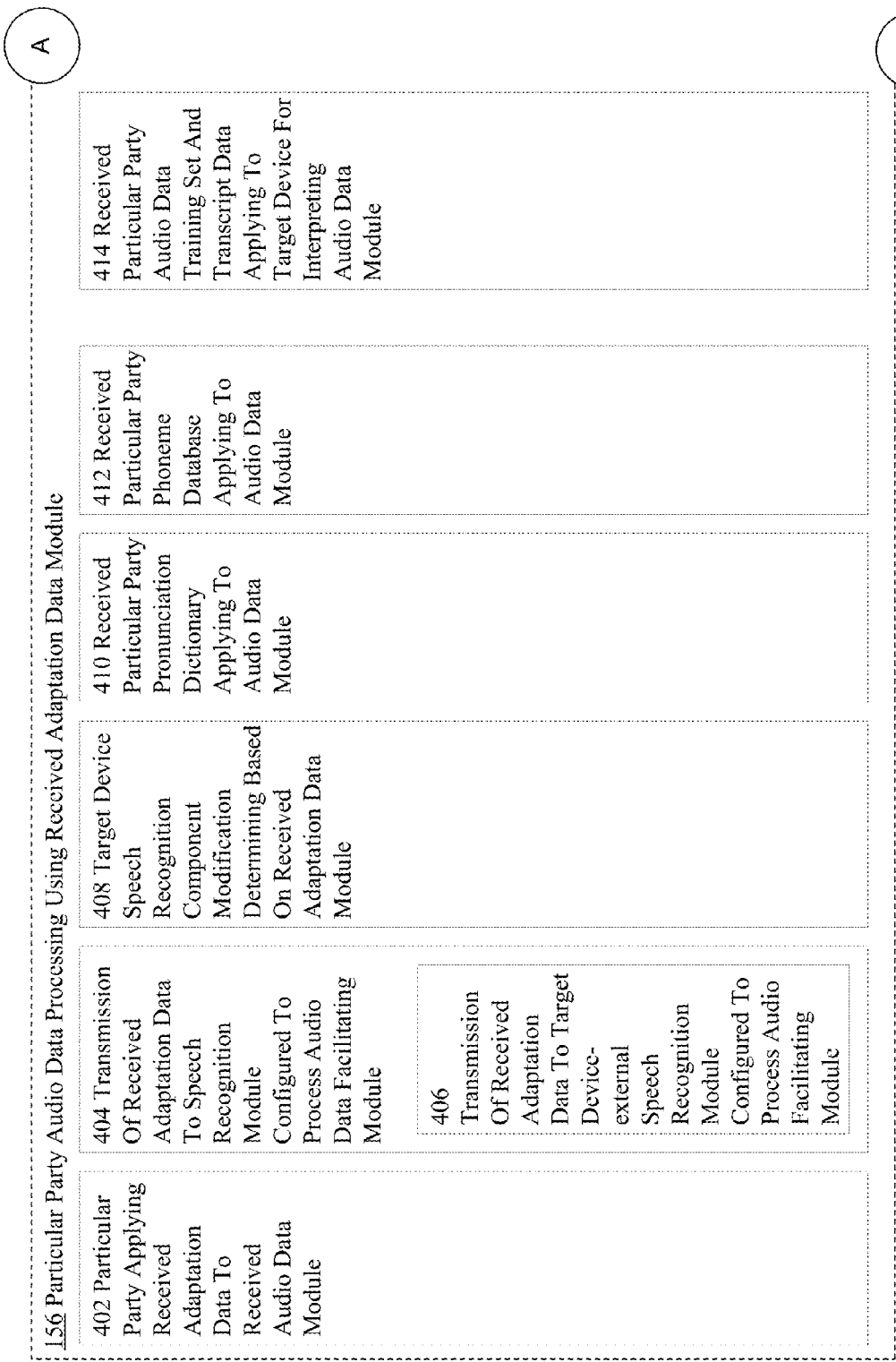

| Fig. 5A | Fig. 5B | Fig. 5C | Fig. 5D | Fig. 5E | Fig. 5F | Fig. 5G | Fig. 5H |

158 Adaptation Data Configured To Be Transmitted To The Particular Device Result-based Updating Module

| 560 Determining Not To Modify Adaptation Data And Configuring Original Adaptation Data To Be Transmitted Back To Particular Device As Updated Adaptation Data Module | 562 Determining Not To Modify Adaptation Data And Configuring Original Adaptation Data And Indication That A Speech-facilitated Transaction Has Taken Place To Be Transmitted Back To Particular Device As Updated Adaptation Data Module | 564 Transmitting An Instruction Indicating That The Adaptation Data Should Not Be Modified As Updated Adaptation Data Based On A Determination Module | 566 Determining That The Adaptation Data Should Not Be Modified And Transmitting A Recommendation Not To Modify Adaptation Data As Updated Adaptation Data Module | 568 Determining That The Adaptation Data Should Not Be Modified And Transmitting An Instruction To Increment A Speech-facilitated Transaction Counter As Updated Adaptation Data Module |

Fig. 5

| Fig. 5A | Fig. 5B | Fig. 5C | Fig. 5D | Fig. 5E | Fig. 5F | Fig. 5G | Fig. 5H |

FIG. 5E

158 Adaptation Data Configured To Be Transmitted To The Particular Device Result-based Updating Module

570 Adaptation Data Updating Based At Least In Part On Determined Result Module

572 Adaptation Data Updating Based At Least In Part On Result Calculated By Inferred Success Of Speech-facilitated Transaction Module

574 Adaptation Data Updating Based At Least In Part On Result Calculated By Inferred Success Of Speech-facilitated Transaction That Is Inferred From At Least One Speech Characteristic Of Received Speech Module

| 576 Adaptation Data Updating Based At Least In Part On Result Calculated By Inferred Success Of Speech-facilitated Transaction That Is Inferred From A Type Of Word In Received Speech Module | 578 Adaptation Data Updating Based At Least In Part On Result Calculated By Inferred Success Of Speech-facilitated Transaction That Is Inferred From A Tone Of Voice In Received Speech Module | 580 Adaptation Data Updating Based At Least In Part On Result Calculated By Inferred Success Of Speech-facilitated Transaction That Is Inferred From A Number Of Times Words Are Repeated In Received Speech Module |

Fig. 5

| Fig. 5A | Fig. 5B | Fig. 5C | Fig. 5D | Fig. 5E | Fig. 5F | Fig. 5G | Fig. 5H |

158 Adaptation Data Configured To Be Transmitted To The Particular Device Result-based Updating Module

| 582 Adaptation Data Updating Based At Least In Part On Calculated Word Recognition Rate Of Processed Audio Data Module | 584 Adaptation Data Updating Based At Least In Part On Calculated Phoneme Recognition Rate Of Processed Audio Data Module | 586 Adaptation Data Updating Based At Least In Part On Calculated Confidence Rate Of Processed Audio Data Module | 588 Updating Adaptation Data Based At Least In Part On Comparisons Between At Least Two Repeated Utterances Detected In The Processed Audio Data And Configuring Updated Adaptation Data For Transmission To Particular Device Module | 590 Transmitting Updated Adaptation Data To Particular Device, Said Updating Based At Least In Part On Comparisons Between At Least Two Repeated Utterances Detected In The Processed Audio Data Module |

FIG. 5G

| Fig. 5A | Fig. 5B | Fig. 5C | Fig. 5D | Fig. 5E | Fig. 5F | Fig. 5G | Fig. 5H |

158 Adaptation Data Configured To Be Transmitted To The Particular Device Result-based Updating Module 592 Transmitting Updated Adaptation Data To Predetermined Location, Said Updating Based At Least In Part On Processed Audio Data Module 594 Transmitting Updated Adaptation Data To Location Specified By Particular Device, Said Updating Based At Least In Part On Processed Audio Data Module 596 Transmitting Updated Adaptation Data To Retrieval-configured Location Said Updating Based At Least In Part On Processed Audio Data Module

Fig. 5

| Fig. 5A | Fig. 5B | Fig. 5C | Fig. 5D | Fig. 5E | Fig. 5F | Fig. 5G | Fig. 5H |

FIG. 5H

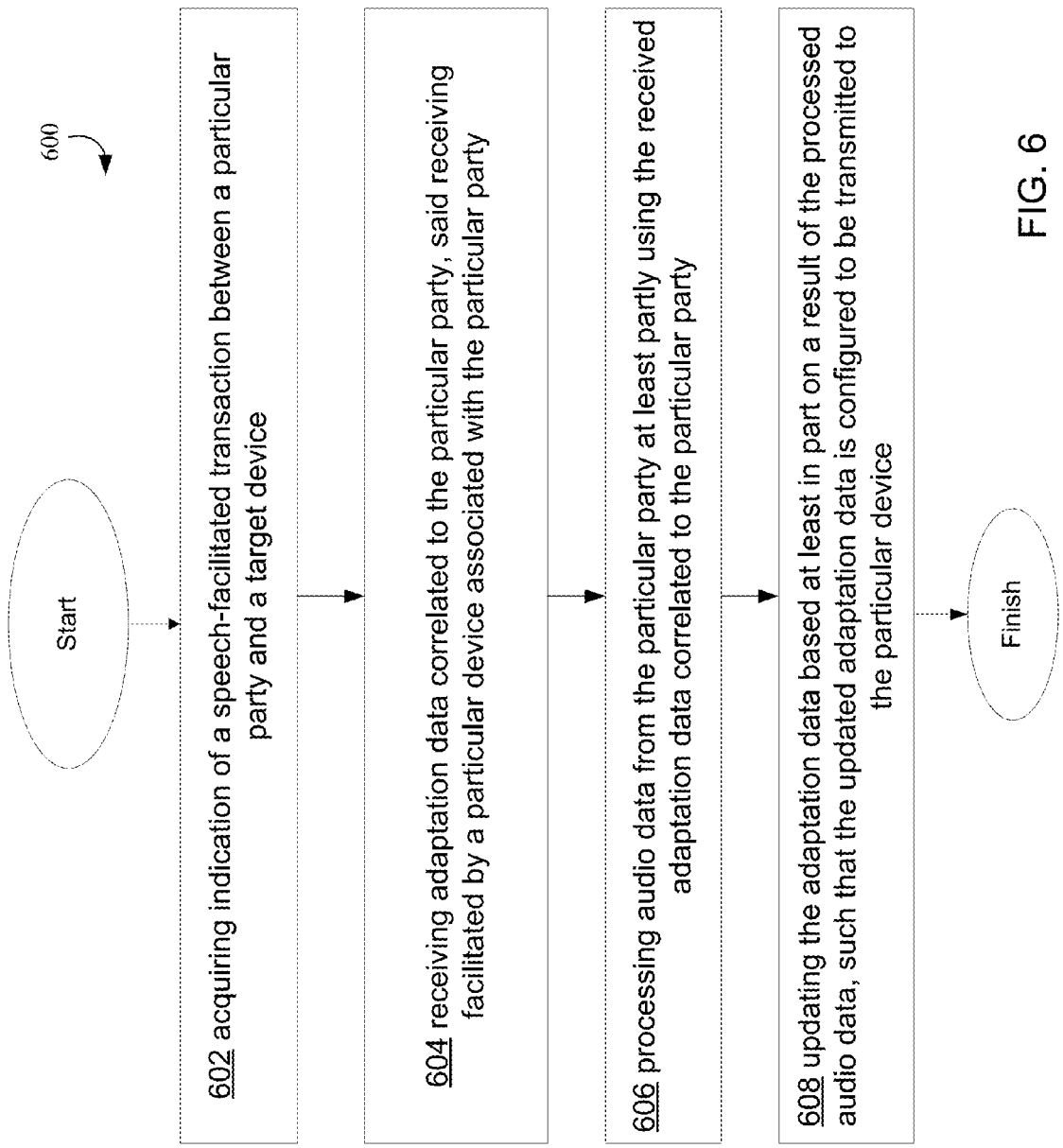

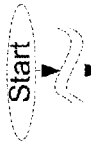

FIG. 9B

606 Applying The Received Adaptation Data Correlated To The Particular Party To The Target Device 916 Applying The Received Adaptation Data Correlated To The Particular Party To A Speech Recognition Component Of The Target Device, Wherein The Received Adaptation Data Comprises Probability Information Of One Or More Words 918 Processing Received Speech From The Particular Party At Least Partly Using The Received Adaptation Data Correlated To The Particular Party 920 Processing Received Speech From The Particular Party At Least Partly Using A Received Pronunciation Dictionary Correlated To The Particular Party 922 Replacing A Pronunciation Definition Of At Least One Word Stored In A Pronunciation Dictionary Of The Target Device With A Corresponding Pronunciation Definition Of At Least One Word Stored In The Received Pronunciation Dictionary 924 Processing The Received Speech Using The Pronunciation Dictionary Of The Target Device With The Replaced Pronunciation Definition Of The At Least One Word

608 updating the adaptation data based at least in part on a result of the processed audio data, such that the updated adaptation data is configured to be transmitted to the particular device 1002 updating the adaptation data based at least in part on a received result of the processed audio data, such that the updated adaptation data is configured to be transmitted to the particular device 1004 updating the adaptation data based at least in part on a received result of the processed audio data from a further particular device, such that the updated adaptation data is configured to be transmitted to the particular device 1006 updating the adaptation data based at least in part on a received result indicating a subjective opinion of the particular party regarding a success of the speech-facilitated transaction 1008 updating the adaptation data based at least in part on a received numerical representation of the subjective opinion of the particular party regarding a success of the speech-facilitated transaction 1010 updating the adaptation data based at least in part on a received result of the processed audio data from the particular party, such that the updated adaptation data is configured to be transmitted to the particular device 1012 updating the adaptation data based at least in part on a received result of the processed audio data from the particular device, such that the updated adaptation data is configured to be transmitted to the particular device 1014 updating the adaptation data based at least in part on a received result indicating the particular party's ranking of a success of the speech-facilitated transaction 1016 updating the adaptation data based at least in part on a received result indicating the particular party's ranking of success of a speech-facilitated portion of the speech-facilitated transaction

FIG. 10A

FIG. 10B

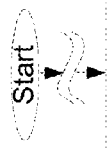
FIG. 10D

608 updating the adaptation data based at least in part on a result of the processed audio data, such that the updated adaptation data is configured to be transmitted to the particular device 1070 updating the adaptation data based at least in part on a determined result of the processed audio data, such that the updated adaptation data is configured to be transmitted to the particular device 1072 updating the adaptation data based at least in part on a result calculated by an inferred success of the speech-facilitated transaction, such that the updated adaptation data is configured to be transmitted to the particular device 1074 updating the adaptation data based at least in part on a result calculated by an inferred success of the speech-facilitated transaction, inferred from at least one characteristic of the received speech from the particular party

| 1076 updating the adaptation data based at least in part on a result calculated by an inferred success of the speech-facilitated transaction, inferred from a type of word used in the received speech from the particular party | 1078 updating the adaptation data based at least in part on a result calculated by an inferred success of the speech-facilitated transaction, inferred from a tone of voice used in the received speech from the particular party | 1080 updating the adaptation data based at least in part on a result calculated by an inferred success of the speech-facilitated transaction, inferred from a number of times a portion of the speech-facilitated transaction was repeated |

FIG. 10F

SPEECH RECOGNITION ADAPTATION SYSTEMS BASED ON ADAPTATION DATA

RELATED APPLICATIONS

For purposes of the USPTO extra-statutory requirements, the present application constitutes a continuation-in-part of U.S. patent application Ser. No. 13/485,733, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed May 31, 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/485,738, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed May 31, 2012, which is currently co-pending or is an application of which a currently co-pending application is entitled to the benefit of the filing date.

BACKGROUND

This application is related to portable speech adaptation data.

SUMMARY

A computationally implemented method includes, but is not limited to, acquiring indication of a speech-facilitated transaction between a particular party and a target device, receiving adaptation data correlated to the particular party, said receiving facilitated by a particular device associated with the particular party, processing audio data from the particular party at least partly using the received adaptation data correlated to the particular party, and updating the adaptation data based at least in part on a result of the processed audio data, such that the updated adaptation data is configured to be transmitted to the particular device. In addition to the foregoing, other method aspects are described in the claims, drawings, and text forming a part of the present disclosure.

In one or more various aspects, related systems include but are not limited to circuitry and/or programming for effecting the herein referenced method aspects; the circuitry and/or programming can be virtually any combination of hardware, software, and/or firmware in one or more machines or article of manufacture configured to effect the herein-referenced method aspects depending upon the design choices of the system designer.

A computationally-implemented system includes, but is not limited to, means for acquiring indication of a speech-facilitated transaction between a particular party and a target device, means for receiving adaptation data correlated to the particular party, said receiving facilitated by a particular device associated with the particular party, means for processing audio data from the particular party at least partly using the received adaptation data correlated to the particular party, and means for updating the adaptation data based at least in part on a result of the processed audio data, such that the updated adaptation data is configured to be transmitted to the particular device. In addition to the foregoing, other system aspects are described in the claims, drawings, and text forming a part of the present disclosure.

A computationally-implemented system includes, but is not limited to, circuitry for acquiring indication of a speech-facilitated transaction between a particular party and a target device, circuitry for receiving adaptation data correlated to the particular party, said receiving facilitated by a particular device associated with the particular party, circuitry for processing audio data from the particular party at least partly using the received adaptation data correlated to the particular party, and circuitry for updating the adaptation data based at least in part on a result of the processed audio data, such that the updated adaptation data is configured to be transmitted to the particular device. In addition to the foregoing, other system aspects are described in the claims, drawings, and text forming a part of the present disclosure.

A computer program product comprising an article of manufacture bears instructions including, but not limited to, one or more instructions for acquiring indication of a speech-facilitated transaction between a particular party and a target device, one or more instructions for receiving adaptation data correlated to the particular party, said receiving facilitated by a particular device associated with the particular party, one or more instructions for processing audio data from the particular party at least partly using the received adaptation data correlated to the particular party, and one or more instructions for updating the adaptation data based at least in part on a result of the processed audio data, such that the updated adaptation data is configured to be transmitted to the particular device. In addition to the foregoing, other computer program product aspects are described in the claims, drawings, and text forming a part of the present disclosure.

A device specified by computational language includes, but is not limited to, one or more interchained groups of ordered matter arranged to acquire indication of a speech-facilitated transaction between a particular party and a target device, one or more interchained groups of ordered matter arranged to receive adaptation data correlated to the particular party, said receiving facilitated by a particular device associated with the particular party, one or more interchained groups of ordered matter arranged to receive audio data from the particular party at least partly using the received adaptation data correlated to the particular party, one or more interchained groups of ordered matter arranged to receive the adaptation data based at least in part on a result of the processed audio data, such that the updated adaptation data is configured to be transmitted to the particular device. In addition to the foregoing, other hardware aspects are described in the claims, drawings, and text forming a part of the present disclosure.

A computer architecture comprising at least one level, includes, but is not limited to architecture configured to be acquiring indication of a speech-facilitated transaction between a particular party and a target device, architecture configured to be receiving adaptation data correlated to the particular party, said receiving facilitated by a particular device associated with the particular party, architecture configured to be processing audio data from the particular party at least partly using the received adaptation data correlated to the particular party, and architecture configured to be updating the adaptation data based at least in part on a result of the processed audio data, such that the updated adaptation data is configured to be transmitted to the particular device. In addition to the foregoing, other architecture aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 1, including FIGS. 1A and 1B, shows a high-level block diagram of a terminal device 130 operating in an exemplary environment 100, according to an embodiment.

FIG. 2, including FIGS. 2A-2D, shows a particular perspective of the speech-facilitated transaction initiation between speech-facilitated transaction initiation between particular party and target device indicator acquiring module 152 of the terminal device 130 of environment 100 of FIG. 1.

FIG. 3, including FIGS. 3A-3B, shows a particular perspective of the particular party-correlated adaptation data receiving facilitated by particular party associated particular device module 154 of the terminal device 130 of environment 100 of FIG. 1.

FIG. 4, including FIGS. 4A-4B, shows a particular perspective of the particular party audio data processing using received adaptation data module 156 of the terminal device 130 of environment 100 of FIG. 1.

FIGS. 5A-5H, shows a particular perspective of the adaptation data configured to be transmitted to the particular device result-based updating module 158 of the terminal device 130 of environment 100 of FIG. 1.

FIG. 6 is a high-level logic flowchart of a process, e.g., operational flow 600, according to an embodiment.

FIG. 9B is a high-level logic flowchart of a process depicting alternate implementations of the received adaptation data processing operation 506 of FIG. 6.

FIG. 10A is a high-level logic flowchart of a process depicting alternate implementations of an adaptation data updating operation 508 of FIG. 6.

FIG. 10B is a high-level logic flowchart of a process depicting alternate implementations of an adaptation data updating operation 508 of FIG. 6.

FIG. 10D is a high-level logic flowchart of a process depicting alternate implementations of an adaptation data updating operation 508 of FIG. 6.

FIG. 10F is a high-level logic flowchart of a process depicting alternate implementations of an adaptation data updating operation 508 of FIG. 6.

DETAILED DESCRIPTION

Figure 1B:
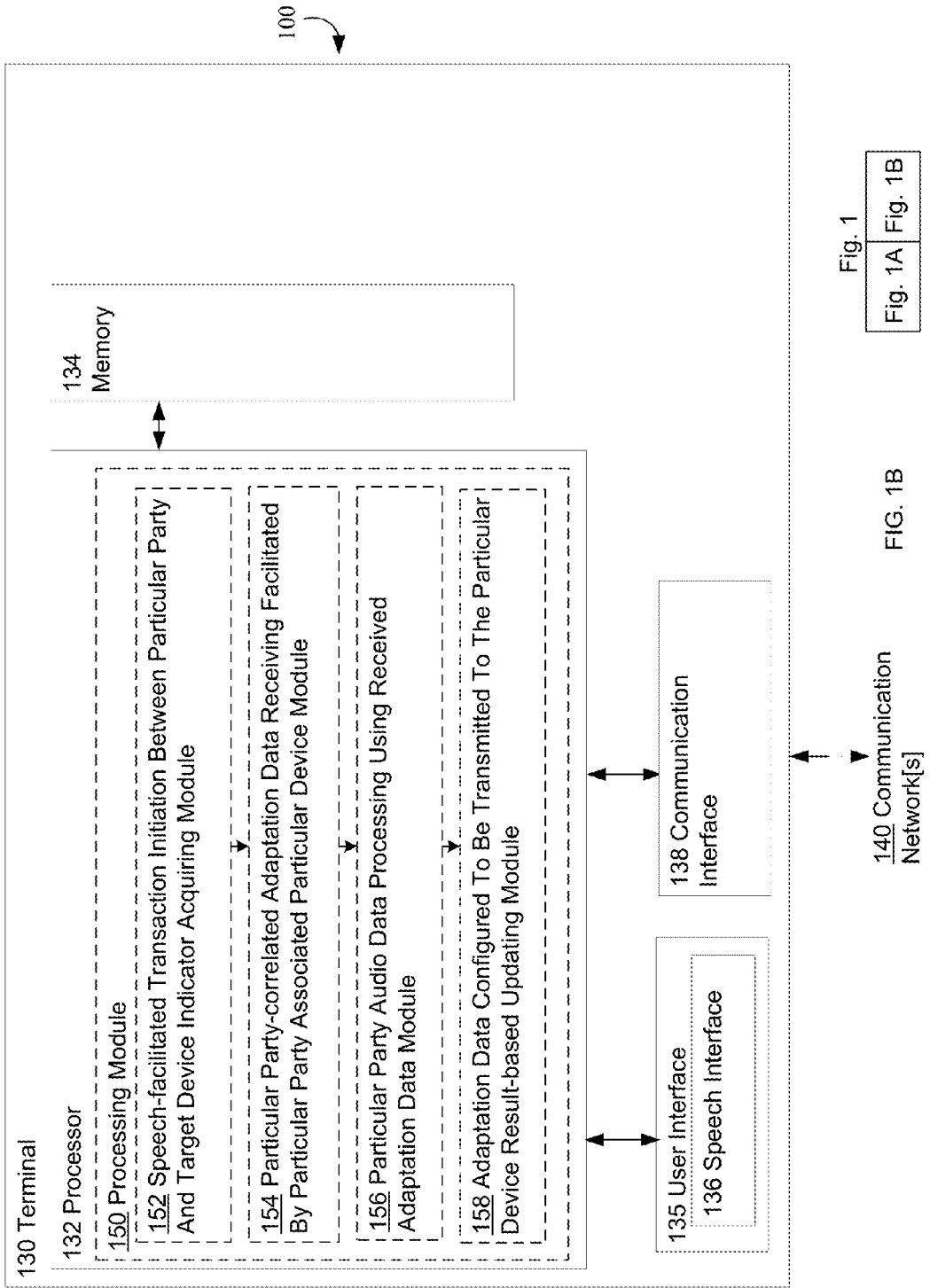

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The proliferation of automation in many transactions is apparent. For example, Automated Teller Machines ("ATMs") dispense money and receive deposits. Airline ticket counter machines check passengers in, dispense tickets, and allow passengers to change or upgrade flights. Train and subway ticket counter machines allow passengers to purchase a ticket to a particular destination without invoking a human interaction at all. Many groceries and pharmacies have self-service checkout machines that allow a consumer to pay for goods purchased by interacting only with a machine. Large companies now staff telephone answering systems with machines that interact with customers, and invoke a human in the transaction only if there is a problem with the machine-facilitated transaction.

Nevertheless, as such automation increases, convenience and accessibility may decrease. Self-checkout machines at grocery stores may be difficult to operate. ATMs and ticket counter machines may be mostly inaccessible to disabled persons or persons requiring special access. Where before, the interaction with a human would allow disabled persons to complete transactions with relative ease, if a disabled person is unable to push the buttons on an ATM, there is little the machine can do to facilitate the transaction to completion. While some of these public terminals allow speech operations, they are configured to the most generic forms of speech, which may be less useful in recognizing particular speakers, thereby leading to frustration for users attempting to speak to the machine. This problem may be especially challenging for the disabled, who already may face significant challenges in completing transactions with automated machines.

In addition, smartphones and tablet devices also now are configured to receive speech commands. Speech and voice controlled automobile systems now appear regularly in motor vehicles, even in economical, mass-produced vehicles. Home entertainment devices, e.g., disc players, televisions, radios, stereos, and the like, may respond to speech commands. Additionally, home security systems may respond to speech commands. In an office setting, a worker's computer may respond to speech from that worker, allowing faster, more efficient workflows. Such systems and machines may be trained to operate with particular users, either through explicit training or through repeated interactions. Sometimes, when that system is upgraded or replaced, e.g., a new TV is bought, that training may be lost with the device. In another example, some video game systems are now designed to utilize speech recognition. These video games may benefit from user-specific speech recognition models and algorithms, which may be stored somewhere separate from the game system, so that the user may play on other game systems, or other games on the same system, while maintaining the advantages of the speech recognition models and algorithms.

Thus, adaptation data for speech recognition systems may be separated from the device that recognizes the speech, and may be more closely associated with a user, e.g., through a device carried by the user, or through a network location associated with the user. In accordance with various embodiments, computationally implemented methods, systems, circuitry, articles of manufacture, and computer program products are designed to, among other things, provide an interface for acquiring indication of a speech-facilitated transaction between a particular party and a target device, an interface for receiving adaptation data correlated to the particular party, said receiving facilitated by a particular device associated with the particular party, an interface for processing audio data from the particular party at least partly using the received adaptation data correlated to the particular party, and an interface for updating the adaptation data based at least in part on a result of the processed audio data, such that the updated adaptation data is configured to be transmitted to the particular device.

The foregoing summary is illustrative only and is not intended to be in any way limiting. In addition to the illustrative aspects, embodiments, and features described above, further aspects, embodiments, and features will become apparent by reference to the drawings and the following detailed description.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, *High-level programming language*, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, *Natural language*, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, *Logic gates*, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, *Computer architecture*, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128-bit strings are currently common). A typical machine language instruction might take the form "111100001010111100001111001111111" (a 32-bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, *Instructions per second*, http://en.wikipedia.org/wiki/Instructions_per_second (as of Jun. 5, 2012, 21:04 GMT).

Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128-bit length strings). Compilers thus translate high-level programming language into machine language.

This compiled machine language, as described above, is then used as the technical specification that sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object that has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Referring now to FIG. 1, FIG. 1 illustrates an example environment 100 in which the methods, systems, circuitry, articles of manufacture, and computer program products and architecture, in accordance with various embodiments, may be implemented by terminal device 130. The terminal device 130, in various embodiments, may be endowed with logic that is designed for acquiring indication of a speech-facilitated transaction between a particular party and a target device, logic that is designed for receiving adaptation data correlated to the particular party, said receiving facilitated by a particular device associated with the particular party, logic that is designed for processing audio data from the particular party at least partly using the received adaptation data correlated to the particular party, and logic that is designed for updating the adaptation data based at least in part on a result of the processed audio data, such that the updated adaptation data is configured to be transmitted to the particular device.

Referring again to the exemplary embodiment 100 of FIG. 1, a user 5 may engage in a speech-facilitated transaction with a terminal device 130. Terminal device 130 may include a microphone 122 and a screen 123. In some embodiments, screen 123 may be a touchscreen. Although FIG. 1A depicts terminal device 130 as a terminal for simplicity of illustration, terminal device 130 could be any device that is configured to receive speech. For example, terminal device 130 may be a terminal, a computer, a navigation system, a phone, a piece of home electronics (e.g., a DVD player, Blu-Ray player, media player, game system, television, receiver, alarm clock, and the like). Terminal device 130 may, in some embodiments, be a home security system, a safe lock, a door lock, a kitchen appliance configured to receive speech, and the like. In some embodiments, terminal device 130 may be a motorized vehicle, e.g., a car, boat, airplane, motorcycle, golf cart, wheelchair, and the like. In some embodiments, terminal device 130 may be a piece of portable electronics, e.g., a laptop computer, a netbook computer, a tablet device, a smartphone, a cellular phone, a radio, a portable navigation system, or any other piece of electronics capable of receiving speech. Terminal device 130 may be a part of an enterprise solution, e.g., a common workstation in an office, a copier, a scanner, a personal workstation in a cubicle, an office directory, an interactive screen, and a telephone. These examples and lists are not meant to be exhaustive, but merely to illustrate a few examples of the terminal device.

In an embodiment, personal device 120 may facilitate the transmission of adaptation data to the terminal 130. In FIG. 1A, personal device 120 is shown as a phone-type device that fits into pocket 15A of the user. Nevertheless, in other embodiments, personal device 120 may be any size and have any specification. Personal device 120 may be a custom device of any shape or size, configured to transmit, receive, and store data. Personal device 120 may include, but is not limited to, a smartphone device, a tablet device, a personal computer device, a laptop device, a keychain device, a key, a personal digital assistant device, a modified memory stick, a universal remote control, or any other piece of electronics. In addition, personal device 120 may be a modified object that is worn, e.g., eyeglasses, a wallet, a credit card, a watch, a chain, or an article of clothing. Anything that is configured to store, transmit, and receive data may be a personal device 120, and personal device 120 is not limited in size to devices that are capable of being carried by a user. Additionally, personal device 120 may not be in direct proximity to the user, e.g., personal device 120 may be a computer sitting on a desk in a user's home or office.

In some embodiments, terminal 130 receives adaptation data from the personal device 120, in a process that will be described in more detail herein. In some embodiments, the adaptation data is transmitted over one or more communication network(s) 140. In various embodiments, the communication network 140 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 40 may be wired, wireless, or a combination of wired and wireless networks. It is noted that "communication network" here refers to one or more communication networks, which may or may not interact with each other.

In some embodiments, the adaptation data does not come directly from the personal device 120. In some embodiments, personal device 120 merely facilitates communication of the adaptation data, e.g., by providing one or more of an address, credentials, instructions, authorization, and recommendations. For example, in some embodiments, personal device 120 provides a location at server 110 at which adaptation data may be received. In some embodiments, personal device 120 retrieves adaptation data from server 10 upon a request from the terminal device 130, and then relays or facilitates in the relaying of the adaptation data to terminal device 130.

In some embodiments, personal device 120 broadcasts the adaptation data regardless of whether a terminal device 130 is listening, e.g., at predetermined, regular, or otherwise-defined intervals. In other embodiments, personal device 120 listens for a request from a terminal device 130, and transmits or broadcasts adaptation data in response to that request. In some embodiments, user 105 determines when personal device 120 broadcasts adaptation data. In still other embodiments, a third party (not shown) triggers the transmission of adaptation data to the terminal device 130, in which the transmission is facilitated by the personal device 120.

Referring again to the exemplary environment 100 depicted in FIG. 1, in various embodiments, the terminal device 130 may comprise, among other elements, a processor 132, a memory 134, and a user interface 135. Processor 132 may include one or more microprocessors, Central Processing Units ("CPU"), a Graphics Processing Units ("GPU"), Physics Processing Units, Digital Signal Processors, Network Processors, Floating Point Processors, and the like. In some embodiments, processor 132 may be a server. In some embodiments, processor 132 may be a distributed-core processor. Although processor 132 is depicted as a single processor that is part of a single computing device 130, in some embodiments, processor 132 may be multiple processors distributed over one or many computing devices 130, which may or may not be configured to work together. Processor 132 is illustrated as being configured to execute computer readable instructions in order to execute one or more operations described above, and as illustrated in FIGS. 6, 7A-7D, 8A-8B, 9A-9B, and 10A-10H. In some embodiments, processor 132 is designed to be configured to operate as processing module 150, which may include speech-facilitated transaction initiation between particular party and target device indicator acquiring module 152, particular party-correlated adaptation data receiving facilitated by particular party associated particular device module 154, particular party audio data processing using received adaptation data module 156, and adaptation data configured to be transmitted to the particular device result-based updating module 158.

Referring again to the exemplary environment 100 of FIG. 1, terminal device 130 may comprise a memory 134. In some embodiments, memory 134 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 34 may be located at a single network site. In other embodiments, memory 134 may be located at multiple network sites, including sites that are distant from each other.

As described above, and with reference to FIG. 1, terminal device 130 may include a user interface 135. The user interface may be implemented in hardware or software, or both, and may include various input and output devices to allow an operator of a computing device 130 to interact with computing device 130. For example, user interface 135 may include, but is not limited to, an audio display, a video display, a microphone, a camera, a keyboard, a mouse, a joystick, a game controller, a touchpad, a handset, or any other device that allows interaction between a computing device and a user. The user interface 135 also may include a speech interface 136, which is configured to receive and/or process speech as input.

Figure 2C:
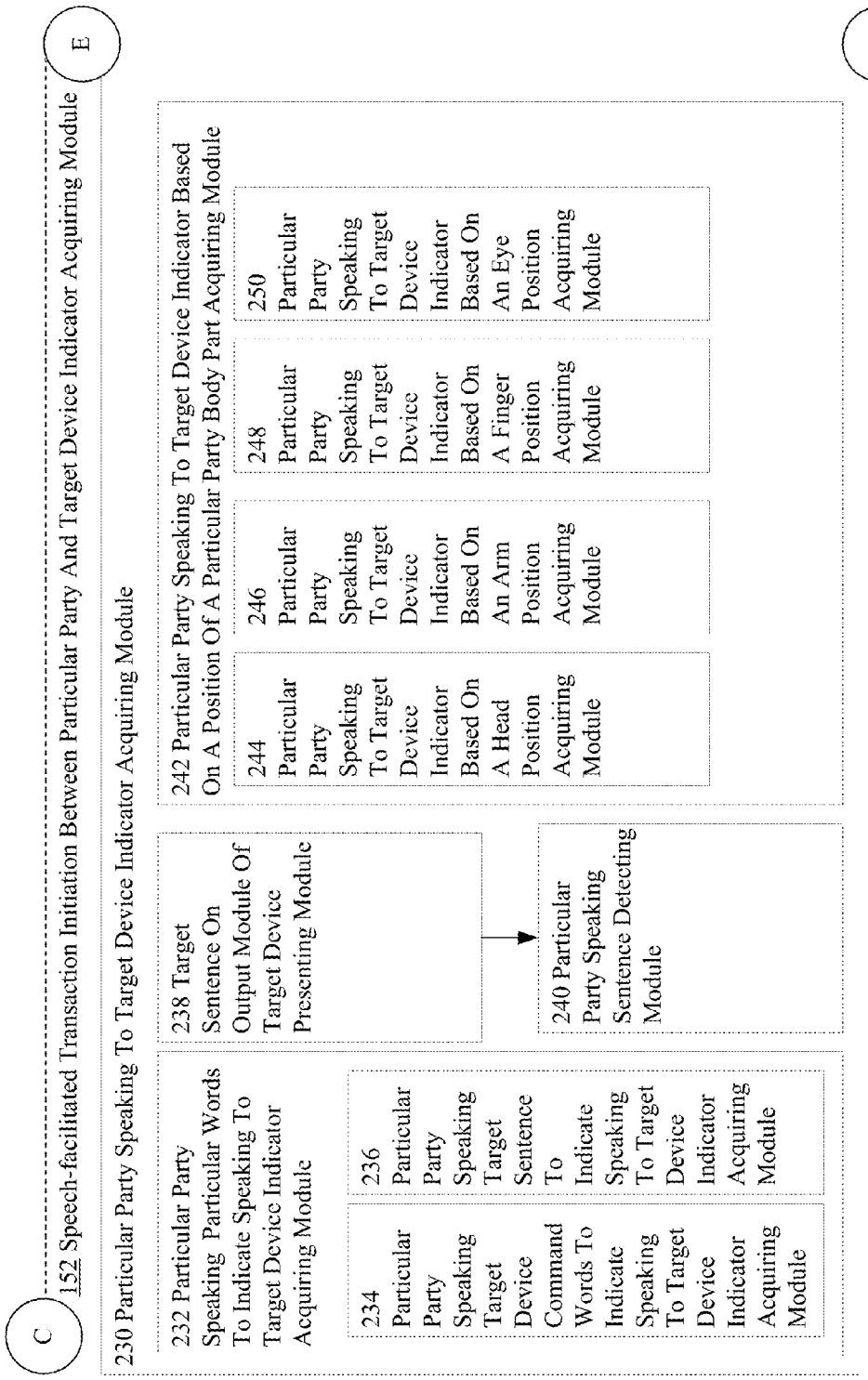

Referring now to FIG. 2, FIG. 2 illustrates an exemplary implementation of the speech-facilitated transaction initiation between particular party and target device indicator acquiring module 152. As illustrated in FIG. 2, the speech-facilitated transaction initiation between particular party and target device indicator acquiring module 152 may include one or more sub-logic modules in various alternative implementations and embodiments. For example, as shown in FIG. 2 (e.g., FIG. 2A), in some embodiments, module 152 may include one or more of speech-facilitated transaction between motor vehicle and driver indicator acquiring module 202, transaction at least partly using speech initiation between particular party and target device indicator acquiring module 210, transaction at least partly using speech and partly using device portion interaction initiation between particular party and target device indicator acquiring module, particular party and target device interaction indication acquiring module 214, and particular party and target device other than speech interaction indication acquiring module 216. In some embodiments, module 202 may further include issued speech command from driver to motor vehicle indicator acquiring module 204. In some embodiments, module 204 may further include issued speech command from driver to motor vehicle instructing motor vehicle mirror adjustment indicator acquiring module 206. In some embodiments, module 206 may further include issued speech command from driver to motor vehicle instructing motor vehicle mirror adjustment indicator acquiring from speech detecting module 208.

Referring again to FIG. 2 (e.g., FIG. 2B), in some embodiments, module 152 may include one or more of particular party and target device particular proximity indication acquiring module 218, particular party and particular device particular proximity indication acquiring module 220, and particular party and particular device particular proximity and particular device and target device further proximity indication acquiring module 222. In some embodiments, module 222 may further include one or more of particular party and key ring particular proximity and key ring and motor vehicle further proximity indication acquiring module 224, particular party and remote control particular proximity and remote control and speech-controlled optical disc player further proximity indication acquiring module, and particular party and smartphone particular proximity and smartphone and automated grocery checkout line device further proximity indication acquiring module 228.

Referring again to FIG. 2 (e.g., FIG. 2C), in some embodiments, module 152 may include particular party speaking to target device indicator acquiring module 230. In some embodiments, module 230 may include one or more of particular party speaking particular words to indicate speaking to target device indicator acquiring module 232 (e.g., which, in some embodiments, may further include one or more of particular party speaking target device command words to indicate speaking to target device indicator acquiring module 234 and particular party speaking target sentence to indicate speaking to target device indicator acquiring module 236), target sentence on output module of target device presenting module 238, particular party speaking sentence detecting module 240, and particular party speaking to target device indicator based on a position of a particular party body part acquiring module 242. In some embodiments, module 242 may further include one or more of particular party speaking to target device indicator based on a head position acquiring module 244, particular party speaking to target device indicator based on an arm position acquiring module 246, particular party speaking to target device indicator based on a finger position acquiring module 248, and particular party speaking to target device indicator based on an eye position acquiring module 250.

Referring again to FIG. 2 (e.g., FIG. 2D), in some embodiments, module 152 may include module 230, as described above. In some embodiments, module 230 may further include particular party speaking to target device indicator based on an orientation of a particular party body part acquiring module 252. In some embodiments, module 252 may include one or more of particular party speaking to target device indicator based on a head orientation acquiring module 254 and particular party speaking to target device indicator based on a shoulder orientation acquiring module 256.

Figure 3B:

Referring now to FIG. 3, FIG. 3 illustrates an exemplary implementation of the particular party-correlated adaptation data receiving facilitated by particular party associated particular device module 154. As illustrated in FIG. 3, the particular party-correlated adaptation data receiving facilitated by particular party associated particular device module 154 may include one or more sub-logic modules in various alternative implementations and embodiments. For example, as shown in FIG. 3 (e.g., FIG. 3A), in some embodiments, module 154 may include one or more of particular party-correlated adaptation data receiving from particular device module 302, particular party-correlated adaptation data comprising particular party speech characteristics, adaptation data location receiving from particular device module 304, particular party-correlated adaptation data comprising particular party speech characteristics, adaptation data reception instruction receiving from particular device module 306, particular party speech characteristic receiving facilitated by particular party associated particular device module 308, particular party instruction for adapting a speech recognition module receiving facilitated by particular party associated particular device module 310, and particular party phoneme pronunciation concept linking data receiving facilitated by particular party associated particular device module 312.

Referring again to FIG. 3 (e.g., FIG. 3B), in some embodiments, module 154 may include one or more of particular party audibly distinguishable sound pronunciation concept linking data receiving facilitated by particular party associated particular device module 314, authorization to receive adaptation data correlated to the particular party receiving from particular party associated particular device module 316, and table of words and corresponding particular party pronunciations of words from smartphone receiving module 318.

Figure 4B:
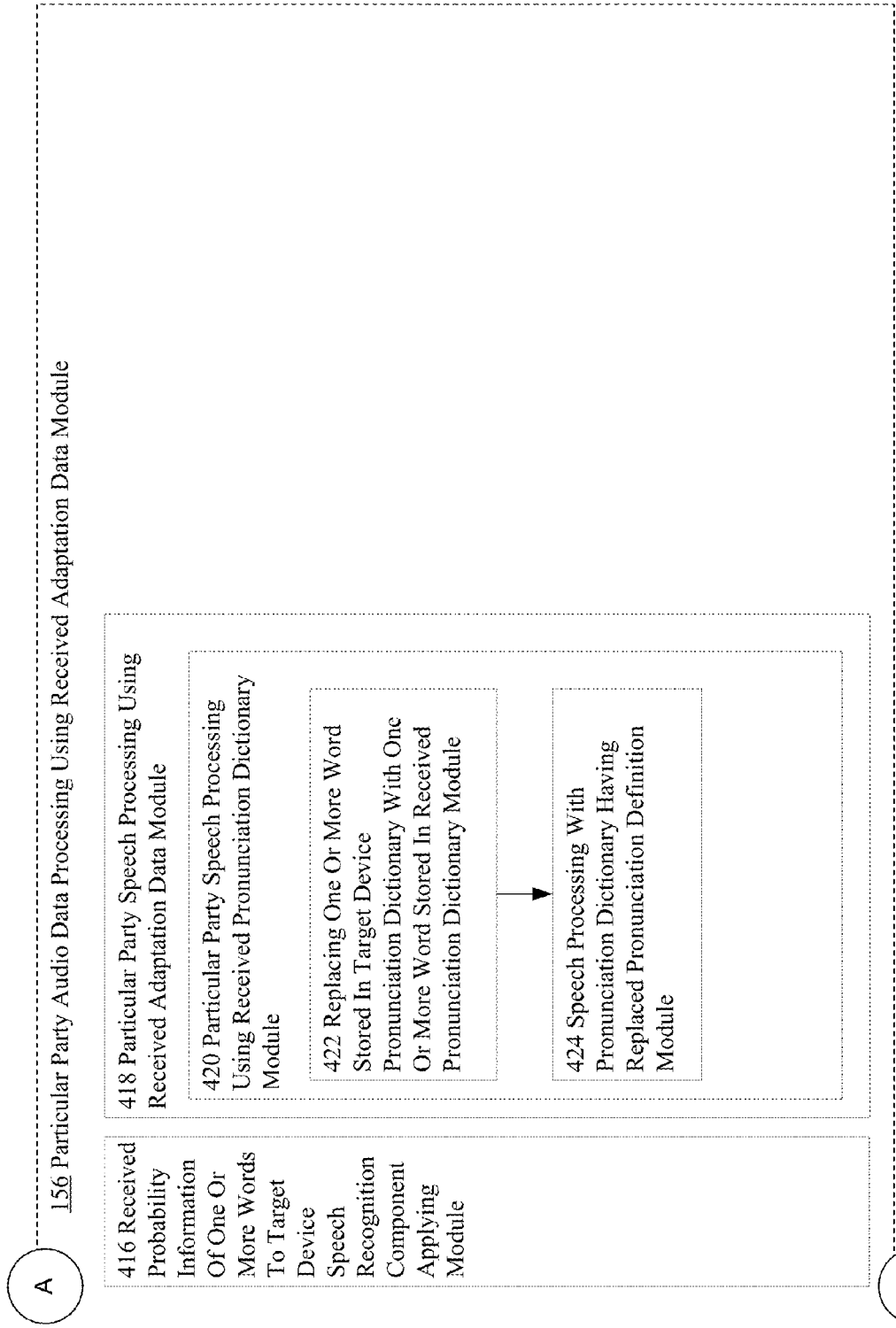

Referring now to FIG. 4, FIG. 4 illustrates an exemplary implementation of the particular party audio data processing using received adaptation data module 156. As illustrated in FIG. 4, the particular party audio data processing using received adaptation data module 156 may include one or more sub-logic modules in various alternative implementations and embodiments. For example, as shown in FIG. 4 (e.g., FIG. 4A), in some embodiments, module 156 may include one or more of particular party applying received adaptation data to received audio data module 402, transmission of received adaptation data to speech recognition module configured to process audio data facilitating module 404 (e.g., which, in some embodiments, may include transmission of received adaptation data to target device-external speech recognition module configured to process audio facilitating module 406), target device speech recognition component modification determining based on received adaptation data module 408, received particular party pronunciation dictionary applying to audio data module 410, received particular party phoneme database applying to audio data module 412, and received particular party audio data training set and transcript data applying to target device for interpreting audio data module 414.

Referring again to FIG. 4 (e.g., FIG. 4B), in some embodiments, module 156 may include one or more of received probability information of one or more words to target device speech recognition component applying module 416 and particular party speech processing using received adaptation data module 418. In some embodiments, module 418 may include particular party speech processing using received pronunciation dictionary module 420. In some embodiments, module 420 may include replacing one or more word stored in target device pronunciation dictionary with one or more word stored in received pronunciation dictionary module 422 and speech processing with pronunciation dictionary having replaced pronunciation definition module 424.

Figures 5, 5A:
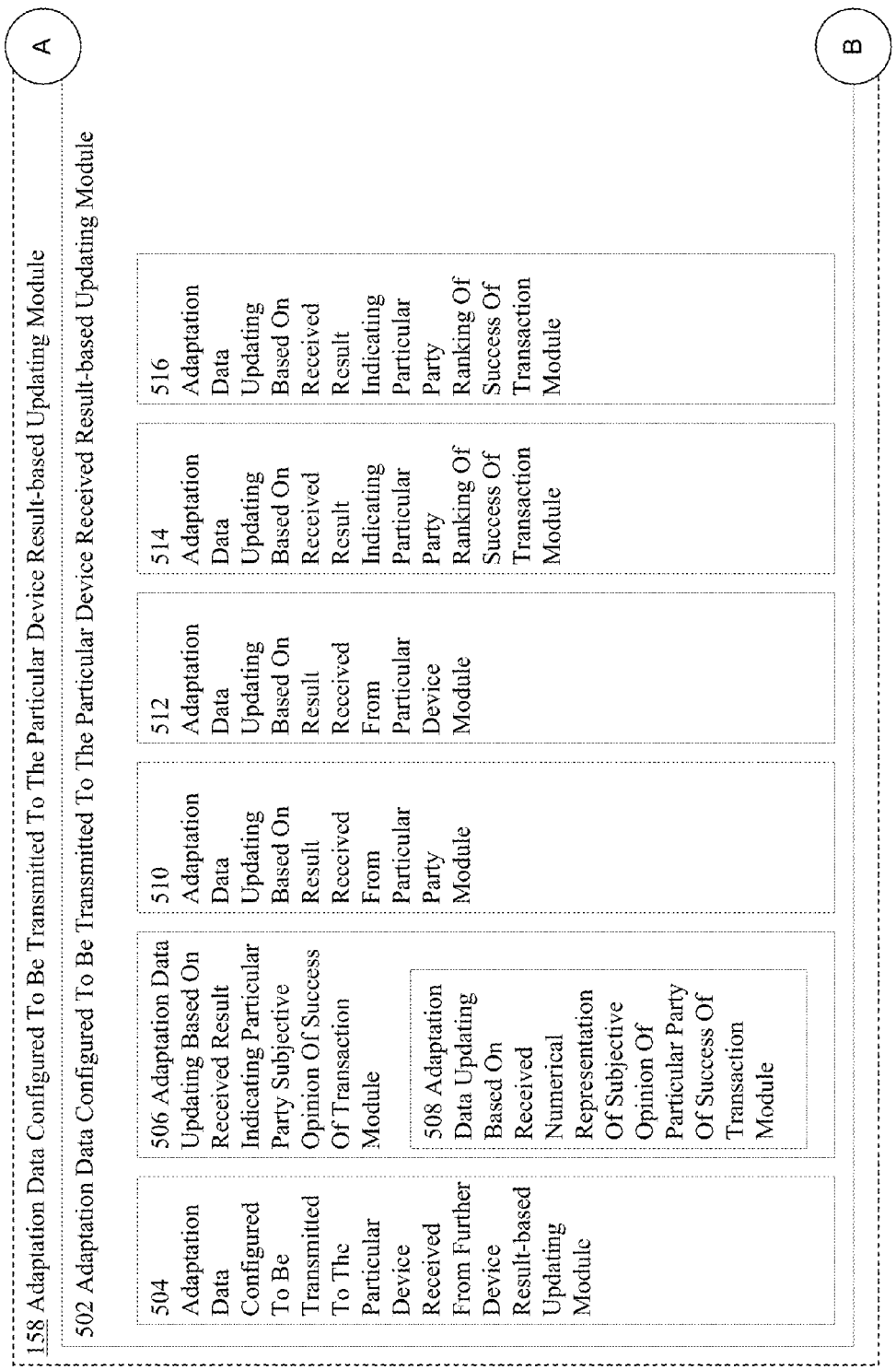
Figure 5:
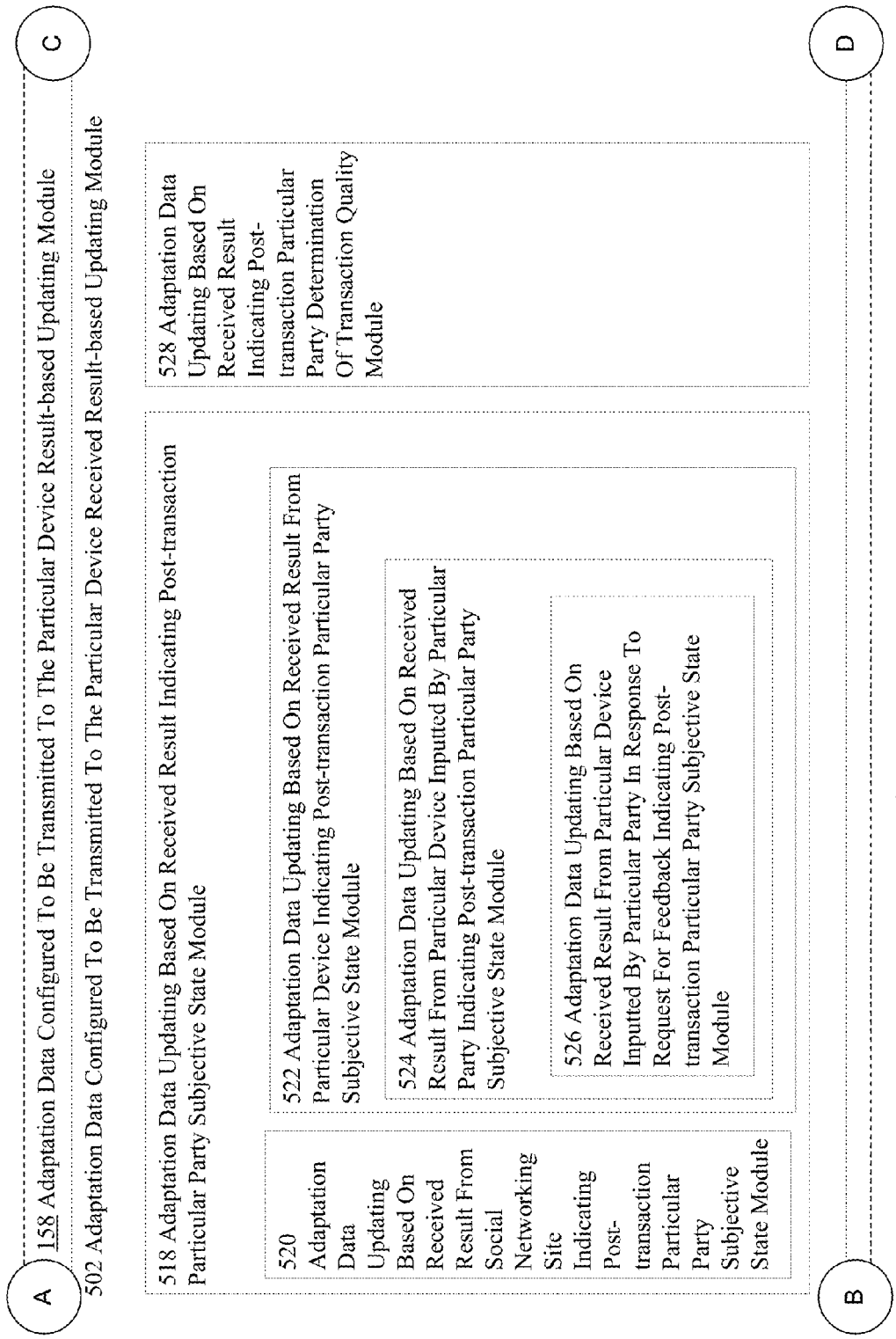
FIG. 5, including

Referring now to FIG. 5, FIG. 5 illustrates an exemplary implementation of the adaptation data configured to be transmitted to the particular device result-based updating module 158. As illustrated in FIG. 5, the adaptation data configured to be transmitted to the particular device result-based updating module 158 may include one or more sub-logic modules in various alternative implementations and embodiments. For example, as shown in FIG. 5 (e.g., FIG. 5A), in some embodiments, module 158 may include speech processing with pronunciation dictionary having replaced pronunciation definition module 502. In some embodiments, module 502 may include one or more of adaptation data configured to be transmitted to the particular device received from further device result-based updating module 504, adaptation data updating based on received result indicating particular party subjective opinion of success of transaction module 506 (e.g., which, in some embodiments, may include adaptation data updating based on received numerical representation of subjective opinion of particular party of success of transaction module 508), adaptation data updating based on result received from particular party module 510, adaptation data updating based on result received from particular device module 512, adaptation data updating based on received result indicating particular party ranking of success of transaction module 514, and adaptation data updating based on received result indicating particular party ranking of success of transaction module 516.

Referring again to FIG. 5 (e.g., FIG. 5B), in some embodiments, module 158 may include module 502, as described above. In some embodiments, module 502 may further include one or more of adaptation data updating based on received result indicating post-transaction particular party subjective state module 518 and adaptation data updating based on received result indicating post-transaction particular party determination of transaction quality module 528. In some embodiments, module 518 may include one or more of adaptation data updating based on received result from social networking site indicating post-transaction particular party subjective state 520 and adaptation data updating based on received result from particular device indicating post-transaction particular party subjective state module 522. In some embodiments, module 522 may include one or more of adaptation data updating based on received result from particular device inputted by particular party indicating post-transaction particular party subjective state module 524. In some embodiments, module 524 may include adaptation data updating based on received result from particular device inputted by particular party in response to request for feedback indicating post-transaction particular party subjective state module 526.

Figure 5C:
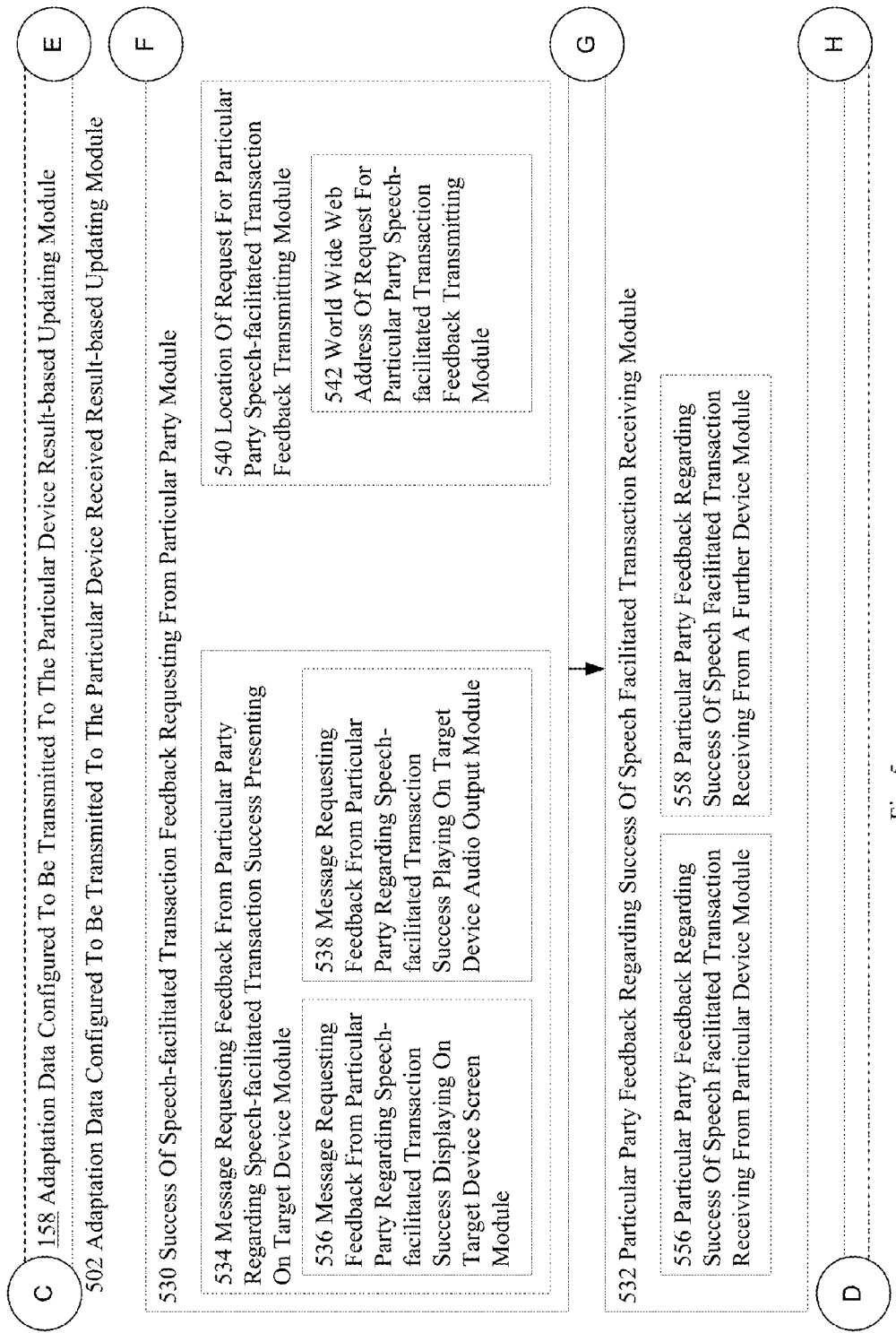

Referring again to FIG. 5 (e.g., FIG. 5C), module 502 may include one or more of success of speech-facilitated transaction feedback requesting from particular party module 530 and particular party feedback regarding success of speech facilitated transaction receiving module 532. In some embodiments, module 530 may include one or more of message requesting feedback from particular party regarding speech-facilitated transaction success presenting on target device module 534 and location of request for particular party speech-facilitated transaction feedback transmitting module 540. In some embodiments, module 534 may include one or more of message requesting feedback from particular party regarding speech-facilitated transaction success displaying on target device screen module 536 and message requesting feedback from particular party regarding speech-facilitated transaction success playing on target device audio output module 538. In some embodiments, module 540 may further include World Wide Web address of request for particular party speech-facilitated transaction feedback transmitting module 542. In some embodiments, module 532 may include one or more of particular party feedback regarding success of speech-facilitated transaction receiving from particular device module 556 and particular party feedback regarding success of speech-facilitated transaction receiving from a further device module 558.

Figure 5D:
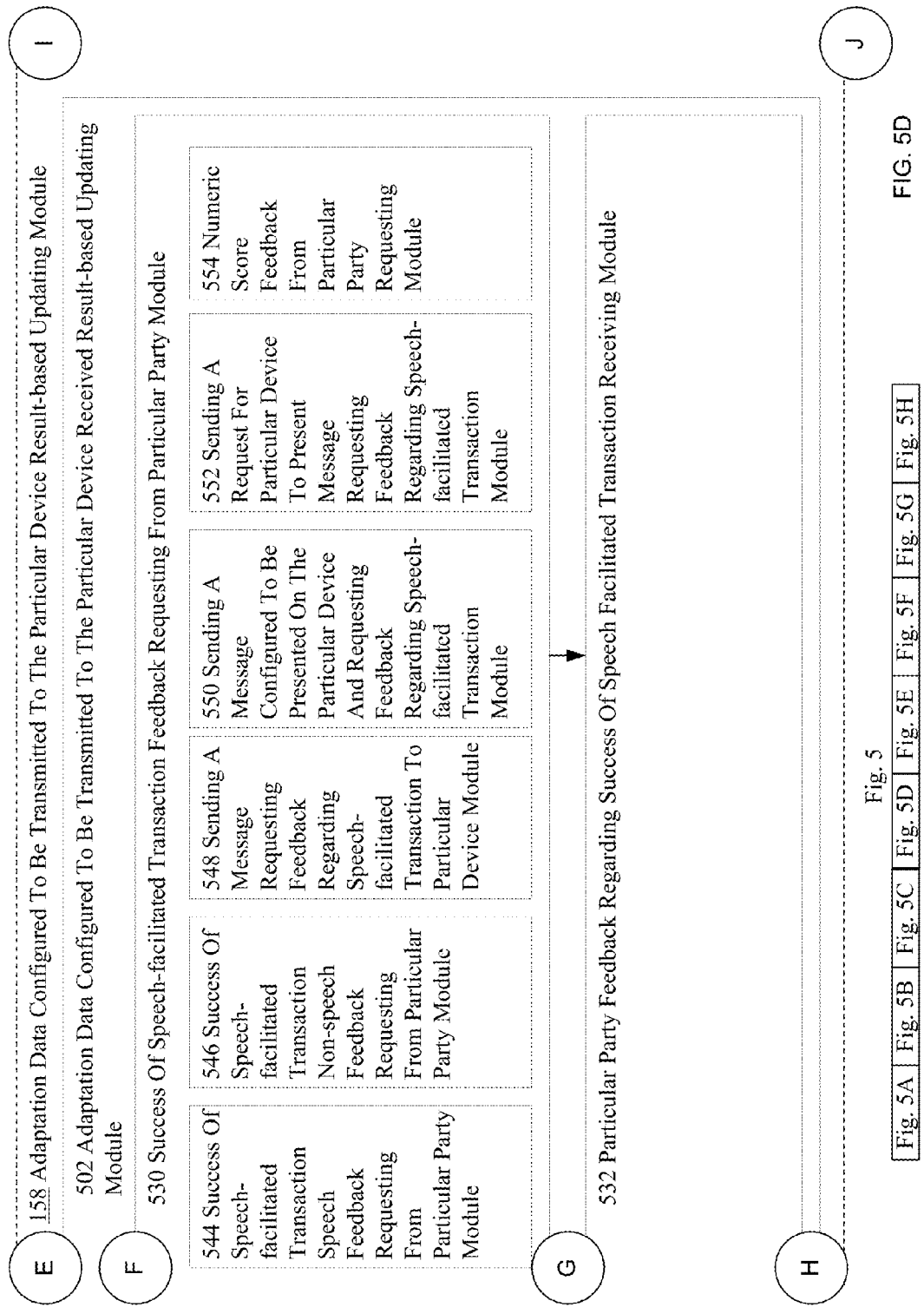

Referring again to FIG. 5 (e.g., FIG. 5D), in some embodiments, module 158 may include module 502, which may include module 530 and module 532, as described above. In some embodiments, module 530 may further include one or more of success of speech-facilitated transaction speech feedback requesting from particular party module 544, success of speech-facilitated transaction non-speech feedback requesting from particular party module 546, sending a message requesting feedback regarding speech-facilitated transaction to particular device module 548, sending a message configured to be presented on the particular device and requesting feedback regarding speech-facilitated transaction module 550, sending a request for particular device to present message requesting feedback regarding speech-facilitated transaction module 552, and numeric score feedback from particular party requesting module 554.

Referring again to FIG. 5 (e.g., FIG. 5E), in some embodiments, module 158 may further include determining not to modify adaptation data and configuring original adaptation data to be transmitted back to particular device as updated adaptation data module 560, determining not to modify adaptation data and configuring original adaptation data and indication that a speech-facilitated transaction has taken place to be transmitted back to particular device as updated adaptation data module 562, transmitting an instruction indicating that the adaptation data should not be modified as updated adaptation data based on a determination module 564, determining that the adaptation data should not be modified and transmitting a recommendation not to modify adaptation data as updated adaptation data module 566, and determining that the adaptation data should not be modified and transmitting an instruction to increment a speech-facilitated transaction counter as updated adaptation data module 568.

Referring again to FIG. 5 (e.g., FIG. 5F), in some embodiments, module 158 may include adaptation data updating based at least in part on determined result module 570. In some embodiments, module 570 may include adaptation data updating based at least in part on result calculated by inferred success of speech-facilitated transaction module 572. In some embodiments, module 572 may include adaptation data updating based at least in part on result calculated by inferred success of speech-facilitated transaction that is inferred from at least one speech characteristic of received speech module 574. In some embodiments, module 574 may include one or more of adaptation data updating based at least in part on result calculated by inferred success of speech-facilitated transaction that is inferred from a type of word in received speech module 576, adaptation data updating based at least in part on result calculated by inferred success of speech-facilitated transaction that is inferred from a tone of voice in received speech module 578, and adaptation data updating based at least in part on result calculated by inferred success of speech-facilitated transaction that is inferred from a number of times words are repeated in received speech module 580.

Referring again to FIG. 5 (e.g., FIG. 5G), in some embodiments, module 158 may include one or more of adaptation data updating based at least in part on calculated word recognition rate of processed audio data module 582, adaptation data updating based at least in part on calculated phoneme recognition rate of processed audio data module 584, adaptation data updating based at least in part on calculated confidence rate of processed audio data module 586, updating adaptation data based at least in part on comparisons between at least two repeated utterances detected in the processed audio data and configuring updated adaptation data for transmission to particular device module 588, and transmitting updated adaptation data to particular device, said updating based at least in part on comparisons between at least two repeated utterances detected in the processed audio data module.

Referring again to FIG. 5 (e.g., FIG. 5H), in some embodiments, module 158 may include transmitting updated adaptation data to predetermined location, said updating based at least in part on processed audio data module 592, transmitting updated adaptation data to location specified by particular device, said updating based at least in part on processed audio data module 594, and transmitting updated adaptation data to retrieval-configured location said updating based at least in part on processed audio data module 596.

A more detailed discussion related to terminal device 130 of FIG. 1 now will be provided with respect to the processes and operations to be described herein. Referring now to FIG. 6, FIG. 6 illustrates an operational flow 600 representing example operations for, among other methods, acquiring indication of a speech-facilitated transaction between a particular party and a target device, receiving adaptation data correlated to the particular party, said receiving facilitated by a particular device associated with the particular party, processing audio data from the particular party at least partly using the received adaptation data correlated to the particular party, and updating the adaptation data based at least in part on a result of the processed audio data, such that the updated adaptation data is configured to be transmitted to the particular device.

In FIG. 6 and in the following FIGS. 7-10 that include various examples of operational flows, discussions and explanations will be provided with respect to the exemplary environment 100 as described above and as illustrated in FIG. 1, and with respect to other examples (e.g., as provided in FIGS. 2-5) and contexts. It should be understood that the operational flows may be executed in a number of other environments and contexts, and/or in modified versions of the systems shown in FIGS. 2-5. Although the various operational flows are presented in the sequence(s) illustrated, it should be understood that the various operations may be performed in other orders other than those that are illustrated, or may be performed concurrently.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Further, in FIG. 6 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 6 as well as the other operations to be described herein may be performed by at least one of a machine, an article of manufacture, or a composition of matter.

It is noted that, for the examples set forth in this application, the tasks and subtasks are commonly represented by short strings of text. This representation is merely for ease of explanation and illustration, and should not be considered as defining the format of tasks and subtasks. Rather, in various embodiments, the tasks and subtasks may be stored and represented in any data format or structure, including numbers, strings, Booleans, classes, methods, complex data structures, and the like.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

Portions of this application may reference trademarked companies and products merely for exemplary purposes. All trademarks remain the sole property of the trademark owner, and in each case where a trademarked product or company is used, a similar product or company may be replaced.

The following examples are meant to be non-exhaustive illustrations of a few of the many embodiments disclosed in the invention. Descriptive statements or other statements that define, limit, or further elaborate upon the function, operation, execution, or implementation of the following examples are intended to apply in the context of the described exemplary embodiment, and should not be interpreted as characterizing any other embodiment, whether explicitly listed or implicitly encompassed by the scope of the invention set forth in the foregoing claims.

Referring again to FIG. 6, FIG. 6 shows operation 600 that includes operation 602 depicting acquiring indication of a speech-facilitated transaction between a particular party and a target device. For example, FIG. 1 shows speech-facilitated transaction initiation between particular party and target device indicator acquiring module 152 acquiring (e.g., receiving, retrieving, generating, or creating) indication (e.g., an electronic signal sent from an interface unit) of initiation (e.g., beginning, or about to begin, e.g., a user walks up to a terminal, and may or may not begin speaking) of a speech-facilitated transaction (e.g., an interaction between a user and a terminal, e.g., a bank terminal) in which at least one component of the interaction uses speech (e.g., the user says "show me my balance" to the machine in order to display the balance on the machine) between a particular party (e.g., a user that wants to withdraw money from an ATM terminal) and a target device (e.g., an ATM terminal).

It is noted that the "indication" does not need to be an electronic signal. The indication may come from a user interaction, from a condition being met, from the detection of a condition being met, or from a change in state of a sensor or device. The indication may be that the user has moved into a particular position, or has pushed a button, or is talking to the machine, or pressed a button on a portable device, or said a particular word or words, or made a gesture, or was captured on a video camera. The indication may be an indication of an RFID tag.

Referring again to FIG. 6, FIG. 6 shows operation 600 that also includes operation 604 depicting receiving adaptation data correlated to the particular party, said receiving facilitated by a particular device associated with the particular party. For example, FIG. 1 shows particular party-correlated adaptation data receiving facilitated by particular party associated particular device module 154 receiving (e.g., receiving, either from a local, e.g., internal source, or from an external source, or from some combination of the two) adaptation data (e.g., data related to speech processing, in this case, a model for that user for words commonly used at an ATM like "withdraw" and "balance") correlated to the particular party (e.g., related to the way that the particular party speaks the words "withdraw," "balance," "one hundred," and "twenty"), said receiving facilitated (e.g., assisted in at least one step, e.g., sends the adaptation data or provides a location where the adaptation data may be retrieved) by a particular device (e.g., a smartphone) associated with the particular party (e.g., carried by the particular party, or stores information regarding the particular party)

Referring again to FIG. 6, FIG. 6 shows operation 600 that includes operation 606 depicting processing audio data from the particular party at least partly using the received adaptation data correlated to the particular party. For example, FIG. 1 shows particular party audio data processing using received adaptation data module 156 processing audio data (e.g., speech data, e.g., in some embodiments, the audio data may also include other sounds picked up by the microphone, regardless of whether processing is attempted on the data, and regardless of whether the audio data is ultimately converted into another format or into one or more intermediate formats) from the particular party (e.g., the user of the ATM) to which the received adaptation data (e.g., the user's specific model for commonly used ATM words) has been applied (e.g., the received adaptation data, e.g., the user's specific model for commonly used ATM words, has been received, and is used, either in part, or in whole, in assisting in processing the audio data, said processing may occur at any stage of processing the audio data, from receipt at the microphone to conversion to another type of data entirely, and the received adaptation data may work in concert with other modules of the system, may operate by itself, and may replace, modify, supplement, change, interact with, or otherwise operate in conjunction with one or more modules of the system designed to process the audio data).

Referring again to FIG. 6, FIG. 6 shows operation 600 that includes operation 608 depicting updating the adaptation data based at least in part on a result of the processed audio data, such that the updated adaptation data is configured to be transmitted to the particular device. For example, FIG. 1 shows adaptation data configured to be transmitted to the particular device result-based updating module 158 updating (e.g., determining whether an update needs to be made, and modifying, adding to, changing, or otherwise presenting additional information based on the determination) the adaptation data (e.g., data related to speech processing, in this case, a model for that user for words commonly used at an ATM like "withdraw" and "balance") based at least in part on a result of the processed audio data (e.g., if the user had to speak the word "withdraw" three times before the word was recognized, the adaptation data that includes the model for the user speaking the word "withdraw" might be changed to reflect a slightly different pronunciation, based on how the word was pronounced during the speech transaction, and/or by which pronunciation was recognized by the system), such that the updated adaptation data (e.g., the adaptation data after it has been determined whether to update the model) is configured to be transmitted to the particular device (e.g., the smartphone carried by the user, e.g., which, in this embodiment, manages the adaptation data).

Figure 7A:
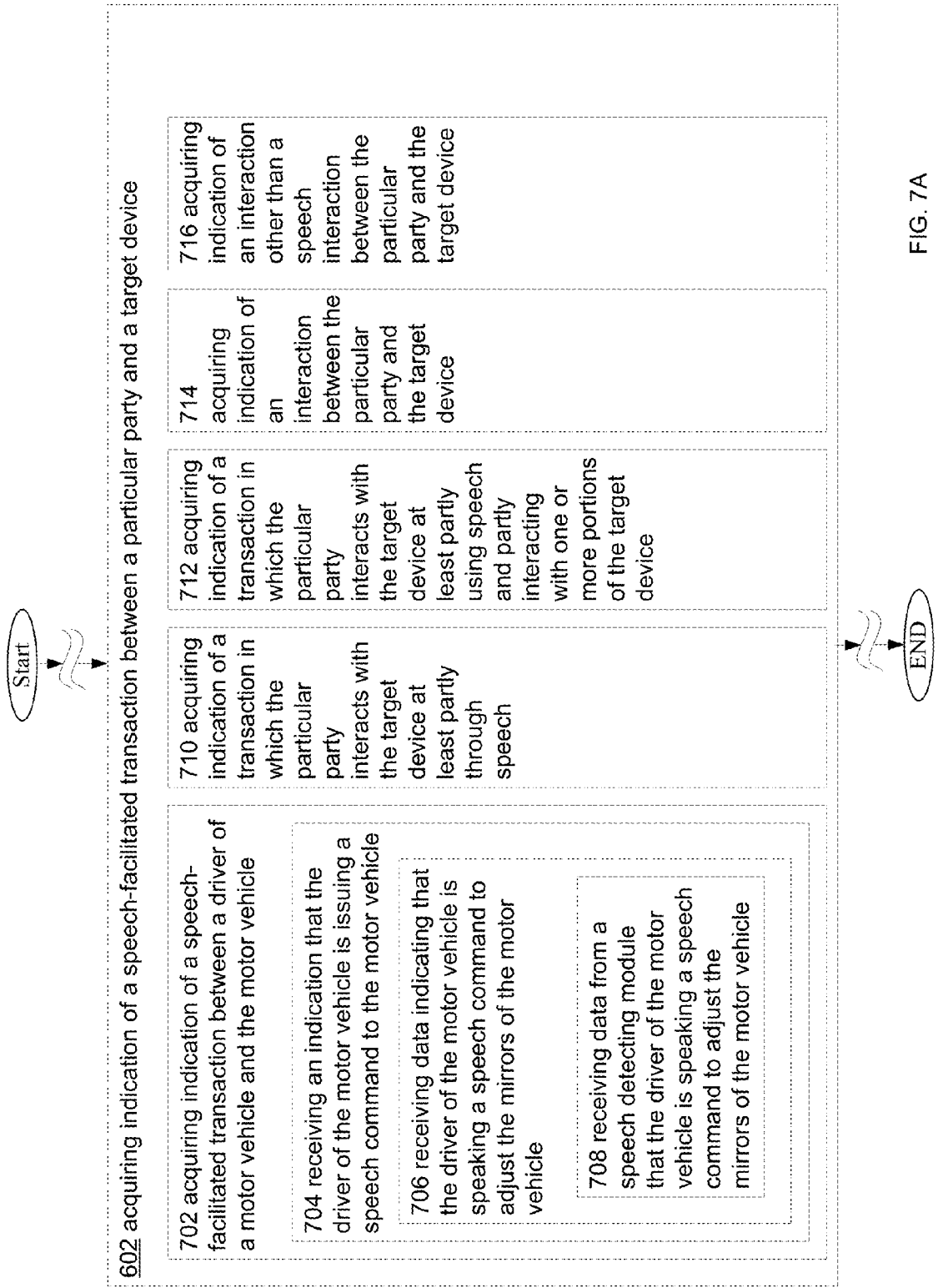
FIG. 7A is a high-level logic flowchart of a process depicting alternate implementations of an indication of initiation acquiring operation 502 of FIG. 6.
Figure 7B:
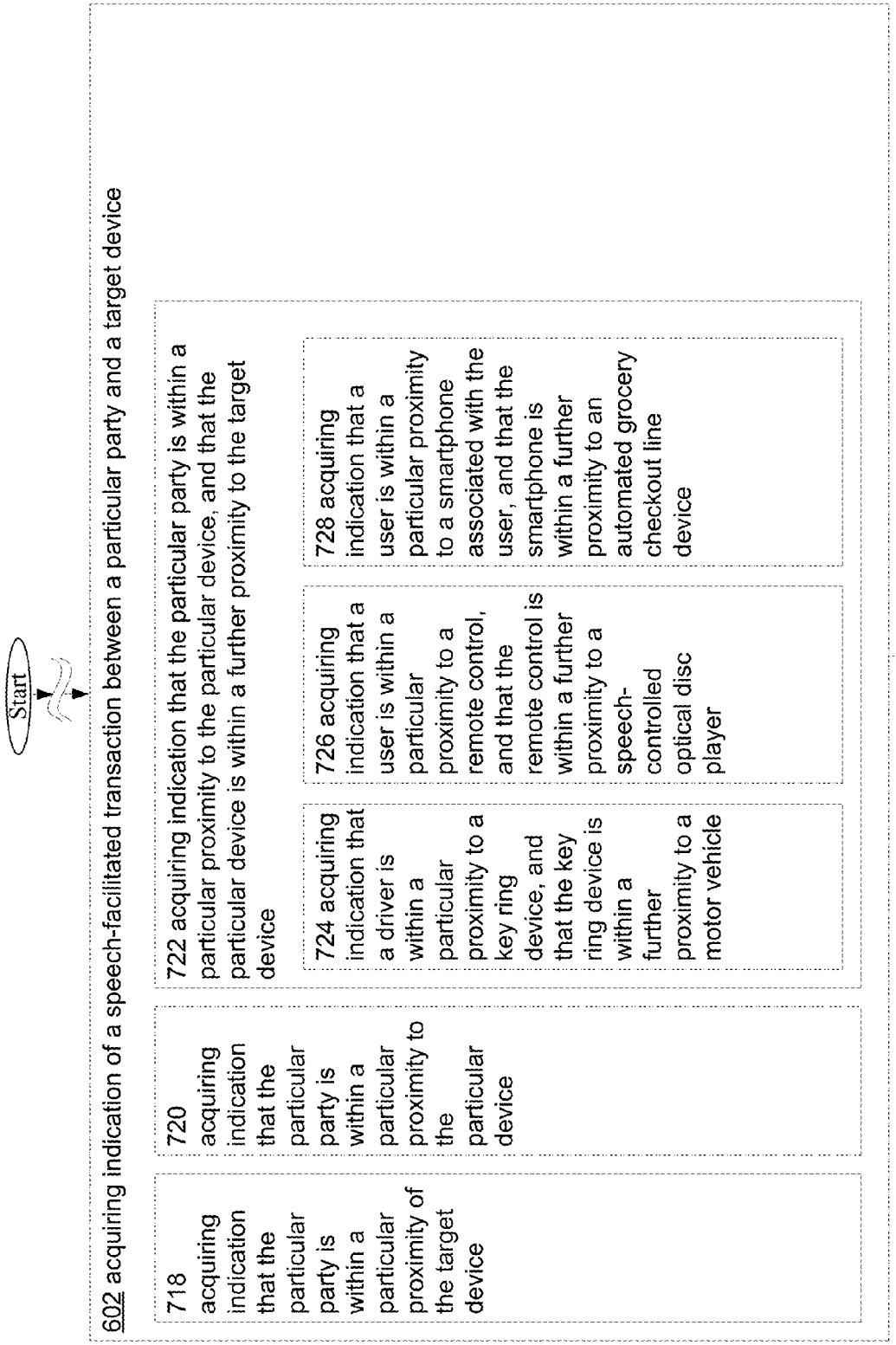
FIG. 7B is a high-level logic flowchart of a process depicting alternate implementations of an indication of initiation acquiring operation 502 of FIG. 6.

FIGS. 7A-7B depict various implementations of operation 602, according to embodiments. Referring now to FIG. 7A, operation 602 may include operation 702 depicting acquiring indication of a speech-facilitated transaction between a driver of a motor vehicle and the motor vehicle. For example, FIG. 2 shows speech-facilitated transaction between motor vehicle and driver indicator acquiring module 202 acquiring indication (e.g., receives a signal, e.g., from the microphone, e.g., indicating that a driver is talking to the car, e.g., in some embodiments, the indication may come each time the driver speaks, in other embodiments, the indication may come when some other condition is met, e.g., when the driver speaks a particular word or words) of a speech-facilitated transaction (e.g., the driver presents instructions to the motor vehicle to perform an action, e.g., "play artist Norah Jones") between a driver of a motor vehicle (e.g., the person sitting in the front left-hand seat of the car) and the motor vehicle (e.g., a Nissan Altima).

Referring again to FIG. 7A, operation 702 may include operation 704 depicting receiving an indication that the driver of the motor vehicle is issuing a speech command to the motor vehicle. For example, FIG. 2 shows issued speech command from driver to motor vehicle indicator acquiring module 204 receiving an indication (e.g., the user pushes a button on the steering wheel that indicates to the motor vehicle that a speech command is forthcoming) that the driver of the motor vehicle (e.g., a Nissan Versa) is issuing a speech command (e.g., "Volume 23," which commands the vehicle to set the volume to 23) to the motor vehicle (e.g., the Nissan Versa).

Referring again to FIG. 7A, operation 704 may include operation 706 depicting receiving data indicating that the driver of the motor vehicle is speaking a speech command to adjust the mirrors of the motor vehicle. For example, FIG. 2 shows issued speech command from driver to motor vehicle instructing motor vehicle mirror adjustment indicator acquiring module 206 receiving data (e.g., receiving audio data spoken) indicating that the driver of the motor vehicle (e.g., the driver of a Ford Focus) is speaking a speech command (e.g., the driver has said the first word of the command "adjust the mirrors") of the motor vehicle (e.g., the Ford Focus).

Referring again to FIG. 7A, operation 706 may include operation 708 depicting receiving data from a speech detecting module that the driver of the motor vehicle is speaking a speech command to adjust the mirrors of the motor vehicle. For example, FIG. 2 shows issued speech command from driver to motor vehicle instructing motor vehicle mirror adjustment indicator acquiring from speech detecting module 208 receiving data (e.g., receiving a signal from a speech detecting module that has detected that speech is occurring) from a speech detecting module (e.g., a microphone and/or the circuitry/modules that interface with the microphone and/or process audio data) that the driver of the motor vehicle (e.g., the driver of the Ford Taurus) is speaking a speech command (e.g., the driver has started speaking a command "Adjust the driver's side mirror inward") to adjust the mirrors of the motor vehicle.

Referring again to FIG. 7A, operation 602 may include operation 710 depicting acquiring indication of a transaction in which the particular party interacts with the target device at least partly through speech. For example, FIG. 2 shows transaction at least partly using speech initiation between particular party and target device indicator acquiring module 210 acquiring indication of a transaction (e.g., a speech-activated Blu-ray player has a disc inserted into it, which indicates to the Blu-ray player that a speech command may be coming) in which the particular party (e.g., the user or owner of the Blu-ray player) interacts with the target device (e.g., the Blu-ray player) at least partly through speech (e.g., the user may speak a "play" command to play the Blu-Ray, but may use the remote control to set audio settings, or vice versa).

Referring again to FIG. 7A, operation 602 may include operation 712 depicting acquiring indication of a transaction in which the particular party interacts with the target device at least partly using speech and partly interacting with one or more portions of the target device. For example, FIG. 2 shows transaction at least partly using speech and partly using device portion interaction initiation between particular party and target device indicator acquiring module 212 acquiring indication of a transaction (e.g., a person steps in front of an airline ticket dispensing machine) in which the particular party (e.g., the airline ticket holder who needs to print a copy of his ticket) interacts with the target device (e.g., the airline ticket dispensing machine) at least partly using speech (e.g., the ticket holder says his destination city to the machine) and partly interacting with one or more portions of the target device (e.g., the ticket holder swipes his credit card to verify his identity, or pushes a button to dispense a printed ticket).

Referring again to FIG. 7A, operation 602 may include operation 714 depicting acquiring indication of an interaction between the particular party and the target device. For example, FIG. 2 shows particular party and target device interaction indication acquiring module 214 acquiring indication (e.g., a signal indicating that a user has placed groceries on a ledge or on a scale) between the particular party (e.g., a grocery shopper at a self-checkout line) and the target device (e.g., an automated grocery checkout machine that accepts voice commands).

Referring again to FIG. 7A, operation 602 may include operation 716 depicting acquiring indication of an interaction other than a speech interaction between the particular party and the target device. For example, FIG. 2 shows particular party and target device other than speech interaction indication acquiring module 216 acquiring indication (e.g., a signal indicating that a detection has been made by a home security system that a code has been entered into a keypad of the home security system, and the system is now ready to accept voice commands) of an interaction other than a speech interaction (e.g., entering a particular code into a home security system) between the particular party (e.g., the home dweller) and the target device (e.g., all or a portion of the home security system).

Referring now to FIG. 7B, operation 602 may include operation 718 depicting acquiring indication that the particular party is within a particular proximity of the target device. For example, FIG. 2 shows particular party and target device particular proximity indication acquiring module 218 acquiring indication (e.g., receiving a signal) that the particular party (e.g., the user) is within a particular proximity (e.g., within 1 meter) of the target device (e.g., the automated teller machine). It is noted that the distances used to represent exemplary particular proximities and further proximities in the example here and in other portions of this specification do not have particular meaning, unless otherwise indicated. They are merely provided as non-limiting, nonexclusive examples to aid in understanding some of the possible embodiments intended to be covered by the corresponding claim set.

Referring again to FIG. 7B, operation 602 may include operation 720 depicting acquiring indication that the particular party is within a particular proximity to the particular device. For example, FIG. 2 shows particular party and particular device particular proximity indication acquiring module 220 acquiring indication that the particular party (e.g., the user) is within a particular proximity (e.g., 20 cm, e.g., that the device is "on" or carried by the user) to the particular device (e.g., a smartphone).

Referring again to FIG. 7B, operation 602 may include operation 722 depicting acquiring indication that the particular party is within a particular proximity to the particular device, and that the particular device is within a further proximity to the target device. For example, FIG. 2 shows particular party and particular device particular proximity and particular device and target device further proximity indication acquiring module 222 acquiring indication (e.g., receiving a signal) that the particular party (e.g., the user) is within a particular proximity (e.g., within 10 cm) to the particular device (e.g., the universal remote control owned by the user), and that the particular device (e.g., the universal remote control) is within a further proximity (e.g., within 1 m) to the target device (e.g., the audio/visual receiver).

Referring again to FIG. 7B, operation 722 may include operation 724 depicting acquiring indication that a driver is within a particular proximity to a key ring device, and that the key ring device is within a further proximity to a motor vehicle. For example, FIG. 2 shows particular party and key ring particular proximity and key ring and motor vehicle further proximity indication acquiring module 224 acquiring indication (e.g., receiving a signal) that a driver is within a particular proximity (e.g., close enough to be considered to be inside a pocket) to a key ring device (e.g., a device, which may be able to store and/or receive data, but also which may function mechanically as a key ring), and that the key ring device is within a further proximity (e.g., the key ring device is determined to be inside the vehicle) to a motor vehicle.

Referring again to FIG. 7B, operation 722 may include operation 726 depicting acquiring indication that a user is within a particular proximity to a remote control, and that the remote control is within a further proximity to a speech-controlled optical disc player. For example, FIG. 2 shows particular party and remote control particular proximity and remote control and speech-controlled optical disc player further proximity indication acquiring module 226 acquiring indication (e.g., generating a signal that is sent to a different module) that a user is within a particular proximity (e.g., 10 centimeters) to a remote control, and that the remote control is within a further proximity (e.g., 2 meters) to a speech-controlled optical disc player.

Referring again to FIG. 7B, operation 722 may include operation 728 depicting acquiring indication that a user is within a particular proximity to a smartphone associated with the user, and that the smartphone is within a further proximity to an automated grocery checkout line device. For example, FIG. 2 shows particular party and smartphone particular proximity and smartphone and automated grocery checkout line device further proximity indication acquiring module 228 acquiring indication that a user is within a particular proximity (e.g., 30 cm) to a smartphone associated with the user (e.g., a smartphone owned by the user, or for which the user has a voice or data contract with a provider of the phone or the network used by the phone), and the smartphone is within a further proximity (e.g., within 150 cm) to an automated grocery checkout line device.

Figure 7C:
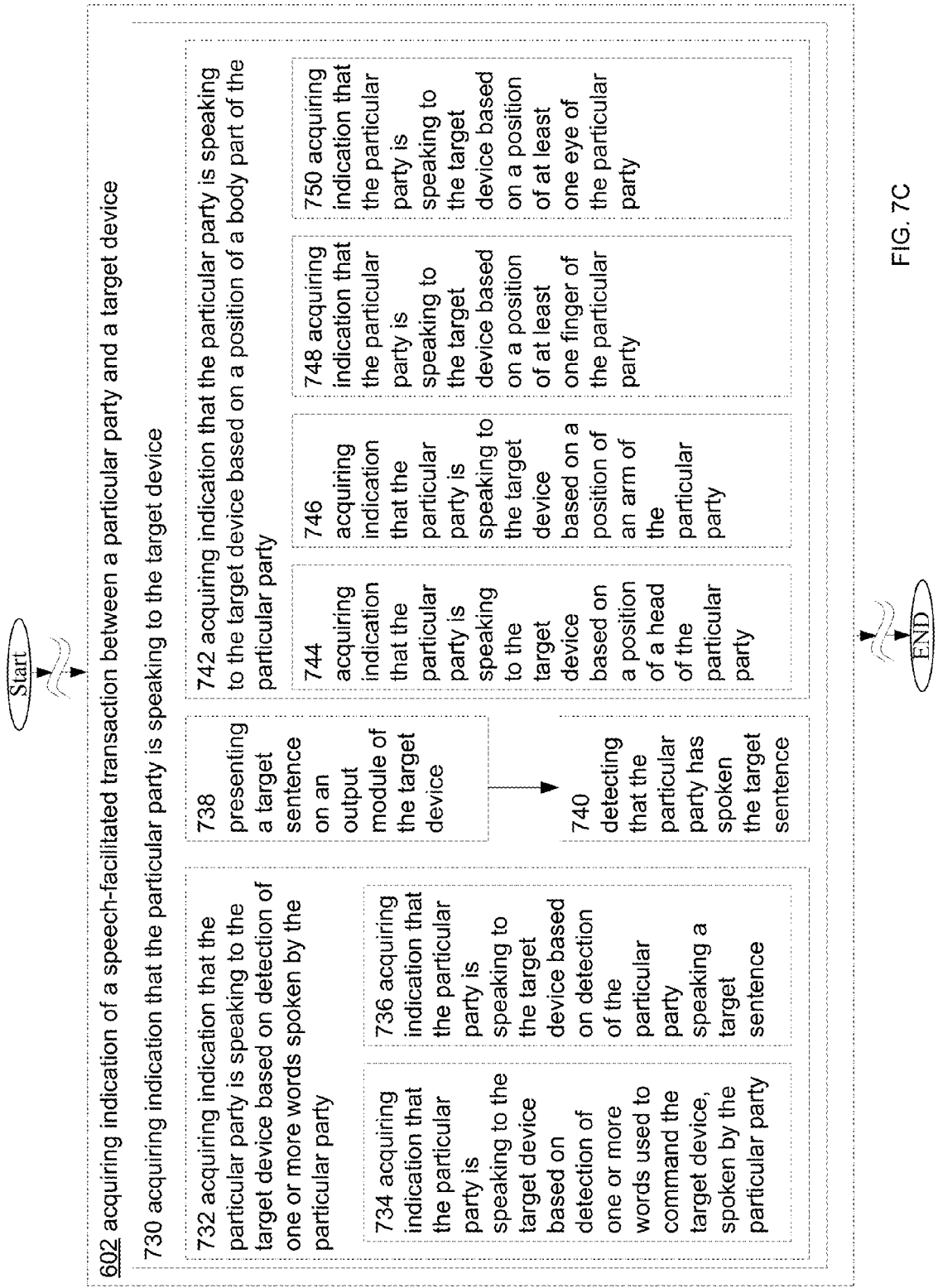
FIG. 7C is a high-level logic flowchart of a process depicting alternate implementations of an indication of initiation acquiring operation 502 of FIG. 6.

Referring now to FIG. 7C, operation 602 may include operation 730 depicting acquiring indication that the particular party is speaking to the target device. For example, FIG. 2 shows particular party speaking to target device indicator acquiring module 230 acquiring indication (e.g., receiving or generating a signal, whether electronic or otherwise, that indicates) that the particular party (e.g., the user) is speaking (e.g., generating audio data) to the target device (e.g., the audio data is directed to a speech-facilitated transaction with the target device, e.g., ordering a hamburger at an automated restaurant station).

Referring again to FIG. 7C, operation 730 may include operation 732 depicting acquiring indication that the particular party is speaking to the target device based on detection of one or more words spoken by the particular party. For example, FIG. 2 shows particular party speaking particular words to indicate speaking to target device indicator acquiring module 232 acquiring indication that the particular party (e.g., the user, e.g., in his car) is speaking to the target device (e.g., the box at the drive-through window) based on detection of one or more words (e.g., at a fast-food restaurant, the word "French fries" triggers an indication that the user is talking to the target device and not to his friend in the passenger seat) spoken by the particular party.

Referring again to FIG. 7C, operation 732 may include operation 734 depicting acquiring indication that the particular party is speaking to the target device based on detection of one or more words used to command the target device, spoken by the particular party. For example, FIG. 2 shows particular party speaking target device command words to indicate speaking to target device indicator acquiring module 234 acquiring indication that the particular party (e.g., the person trying to order a chicken sandwich from a chicken-based fast food restaurant) is speaking to the target device (e.g., a microphone presented for the user to speak into) based on detection of one or more words used to command the target device (e.g., "place order," may command the target device to start listening for the order, e.g., to distinguish from discussion with passengers, or out-loud contemplation of the menu), spoken by the particular party (e.g., the user).

Referring again to FIG. 7C, operation 732 may include operation 736 depicting acquiring indication that the particular party is speaking to the target device based on detection of the particular party speaking a target sentence. For example, FIG. 2 shows particular party speaking target sentence to indicate speaking to target device indicator acquiring module 236 acquiring indication that the particular party (e.g., a bank account holder trying to withdraw money from an automated teller machine) is speaking to the target device based on detection of the particular party speaking a target sentence Referring again to FIG. 7C, operation 730 may include operation 738 depicting presenting a target sentence on an output module of the target device. For example, FIG. 2 shows target sentence on output module of target device presenting module 238 presenting a target sentence (e.g., displaying on a screen of a drive-thru window "please say the phrase, 'I'm ready to order' when you are ready to order) on an output module (e.g., a screen) of the target device (e.g., an automated drive-thru window).

Referring again to FIG. 7C, operation 730 may include operation 740 depicting detecting that the particular party has spoken the target sentence. For example, FIG. 2 shows particular party speaking sentence detecting module 240 detecting that the particular party (e.g., the person ordering from the drive-thru window) has spoken the target sentence (e.g., "I'm ready to order").

Referring again to FIG. 7C, operation 730 may include operation 742 depicting acquiring indication that the particular party is speaking to the target device based on a position of a body part of the particular party. For example, FIG. 2 shows particular party speaking to target device indicator based on a position of a particular party body part acquiring module 242 acquiring indication that the particular party (e.g., the user) is speaking to the target device (e.g., the voice-enabled video game system) based on a position of a body part (e.g., a position of the body or any part thereof, e.g., hand, leg, foot) of the particular party (e.g., the game player points his head at the video game system or at a portion of the television where one or more images are displayed).

Referring again to FIG. 7C, operation 742 may include operation 744 depicting acquiring indication that the particular party is speaking to the target device based on a position of a head of the particular party. For example, FIG. 2 shows particular party speaking to target device indicator based on a head position acquiring module 244 acquiring indication (e.g., determining) that the particular party (e.g., the bank customer) is speaking to the target device (e.g., the automated teller machine) based on a position of a head of the particular party (e.g., if the user's head is positioned a particular distance away from the automated teller machine).

Referring again to FIG. 7C, operation 742 may include operation 746 depicting acquiring indication that the particular party is speaking to the target device based on a position of an arm of the particular party. For example, FIG. 2 shows particular party speaking to target device indicator based on an arm position acquiring module 246 acquiring indication (e.g., receiving a signal from the game controller that detects arm position) that the particular party is speaking to the target device based on a position of an arm of the particular party (e.g., the game player)

Referring again to FIG. 7C, operation 742 may include operation 748 depicting acquiring indication that the particular party is speaking to the target device based on a position of at least one finger of the particular party. For example, FIG. 2 shows particular party speaking to target device indicator based on a finger position acquiring module 248 acquiring indication that the particular party (e.g., the user) is speaking to the target device (e.g., the speech-controllable television) based on a position of at least one finger of the particular party (e.g., pointing towards the television).

Referring again to FIG. 7C, operation 742 may include operation 750 depicting acquiring indication that the particular party is speaking to the target device based on a position of at least one eye of the particular party. For example, FIG. 2 shows particular party speaking to target device indicator based on an eye position acquiring module 250 acquiring indication (e.g., acquiring indication (e.g., receiving data, that when processed, indicates) that the particular party is speaking to the target device (e.g., the networked computer) based on a position of at least one eye of the particular party (e.g., tracked through a webcam on the computer).

Figure 7D:
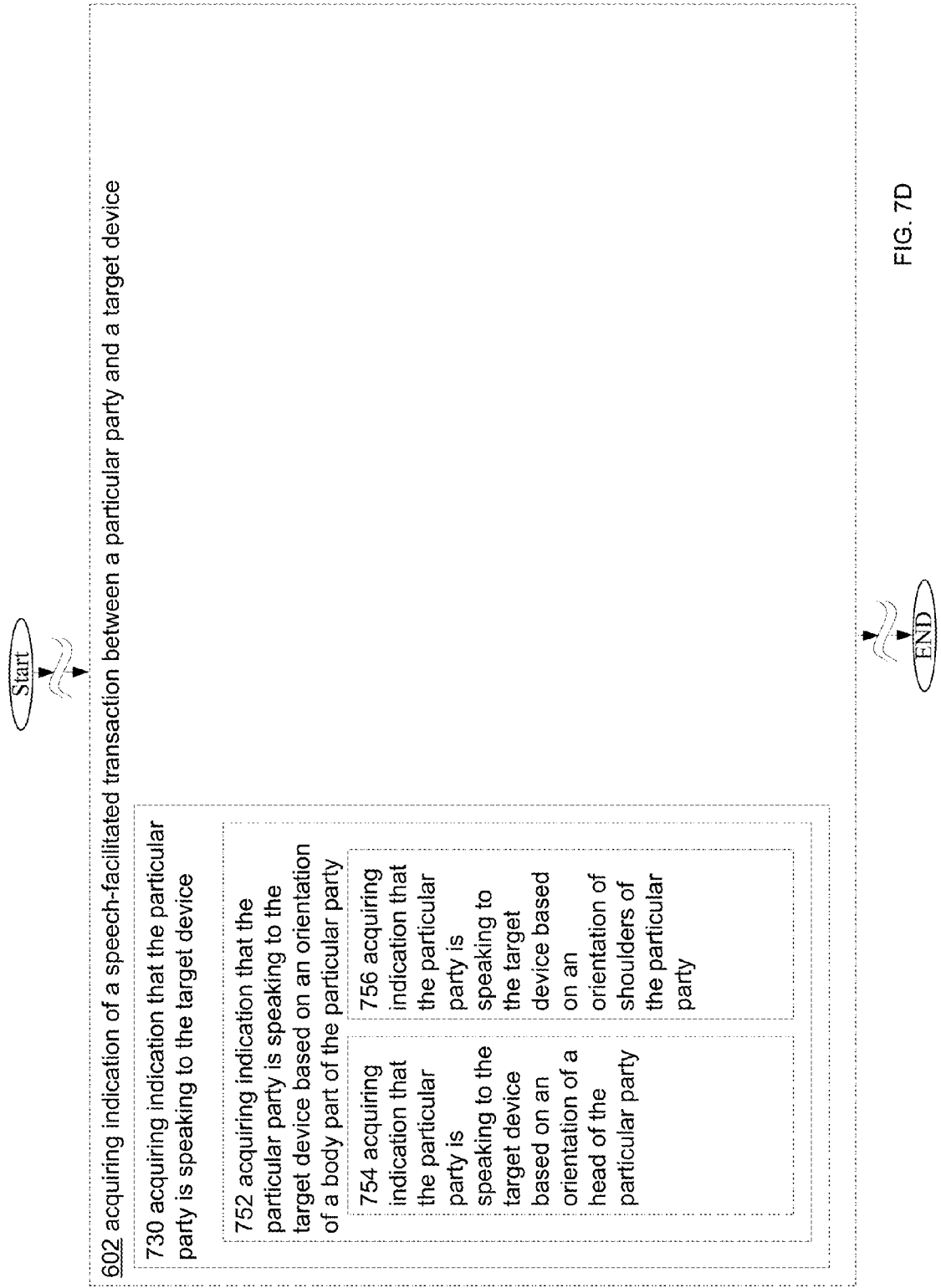
FIG. 7D is a high-level logic flowchart of a process depicting alternate implementations of an indication of initiation acquiring operation 502 of FIG. 6.

Referring now to FIG. 7D, operation 730 may include operation 752 depicting acquiring indication that the particular party is speaking to the target device based on an orientation of a body part of the particular party. For example, FIG. 2 shows particular party speaking to target device indicator based on an orientation of a particular party body part acquiring module 252 acquiring indication (e.g., generating a signal when the body part orientation has a particular value) that the particular party (e.g., the user of the automated grocery store checkout) is speaking to the target device (e.g., the automated grocery store checkout) based on an orientation of a body part (e.g., an orientation of the torso) of the particular party).

Referring again to FIG. 7D, operation 752 may include operation 754 depicting acquiring indication that the particular party is speaking to the target device based on an orientation of a head of the particular party. For example, FIG. 2 shows particular party speaking to target device indicator based on a head orientation acquiring module 254 acquiring indication (e.g., receiving a signal) that the particular party (e.g., the computer user having a login) is speaking to the target device (e.g., an enterprise computer in an office building configured to receive speech input into a word processing program) based on an orientation of a head of the particular party (e.g., the software determines that the user is speaking to the computer when the user's head is oriented such that the user's head points toward the location on the screen where the word processing document is open).

Referring again to FIG. 7D, operation 752 may include operation 756 depicting acquiring indication that the particular party is speaking to the target device based on an orientation of shoulders of the particular party. For example, FIG. 2 shows particular party speaking to target device indicator based on a shoulder orientation acquiring module 256 acquiring indication (e.g., receiving a data transmission that instructs a module) that the particular party (e.g., the user) is speaking to the target device (e.g., the automated ticket dispensing machine) based on an orientation of the shoulders (e.g., the orientation indicating that the user is facing the automated ticket dispensing machine) of the particular party (e.g., the user).

Figure 8A:
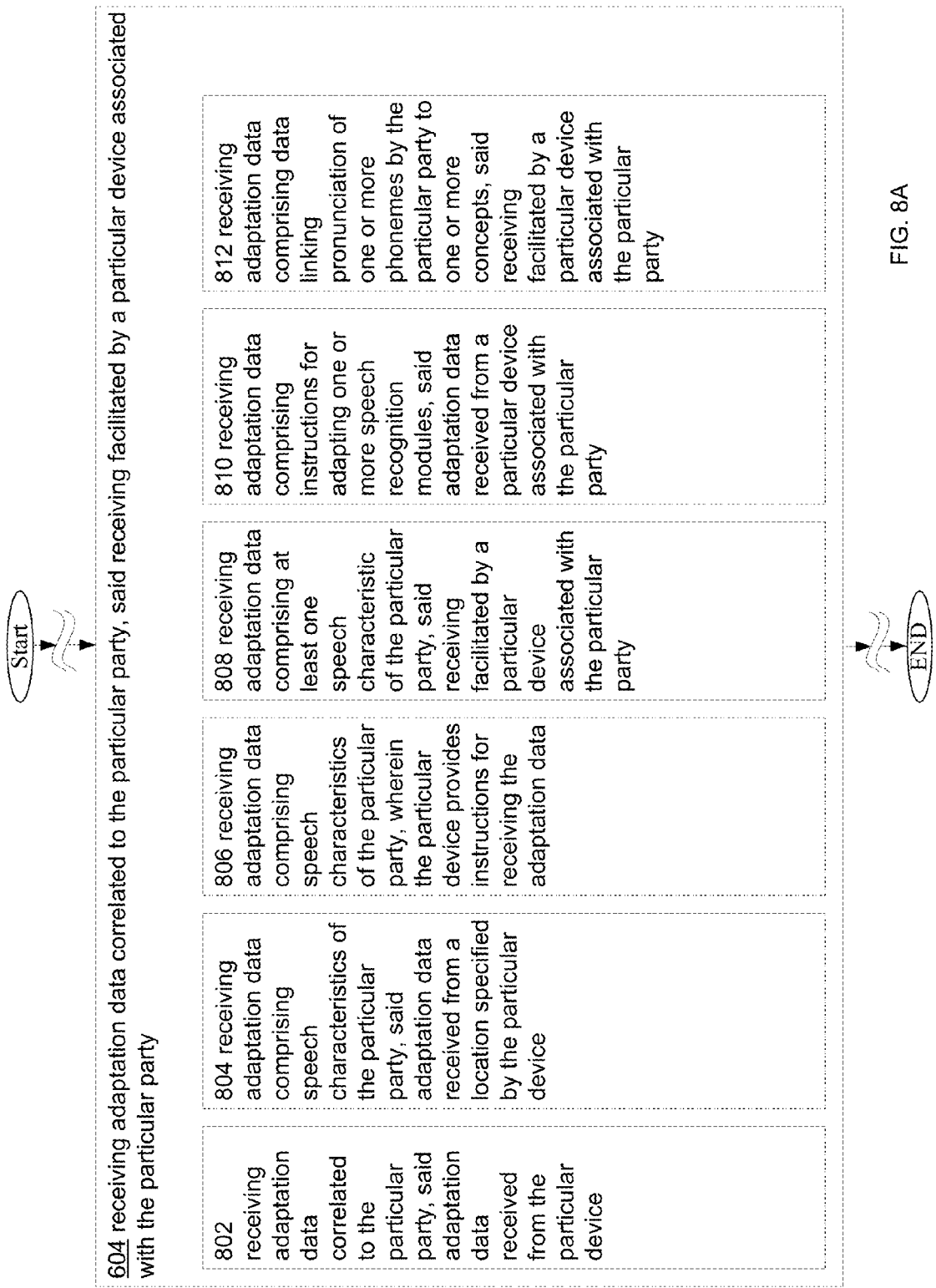
FIG. 8A is a high-level logic flowchart of a process depicting alternate implementations of the adaptation data receiving operation 504 of FIG. 6.
Figure 8B:
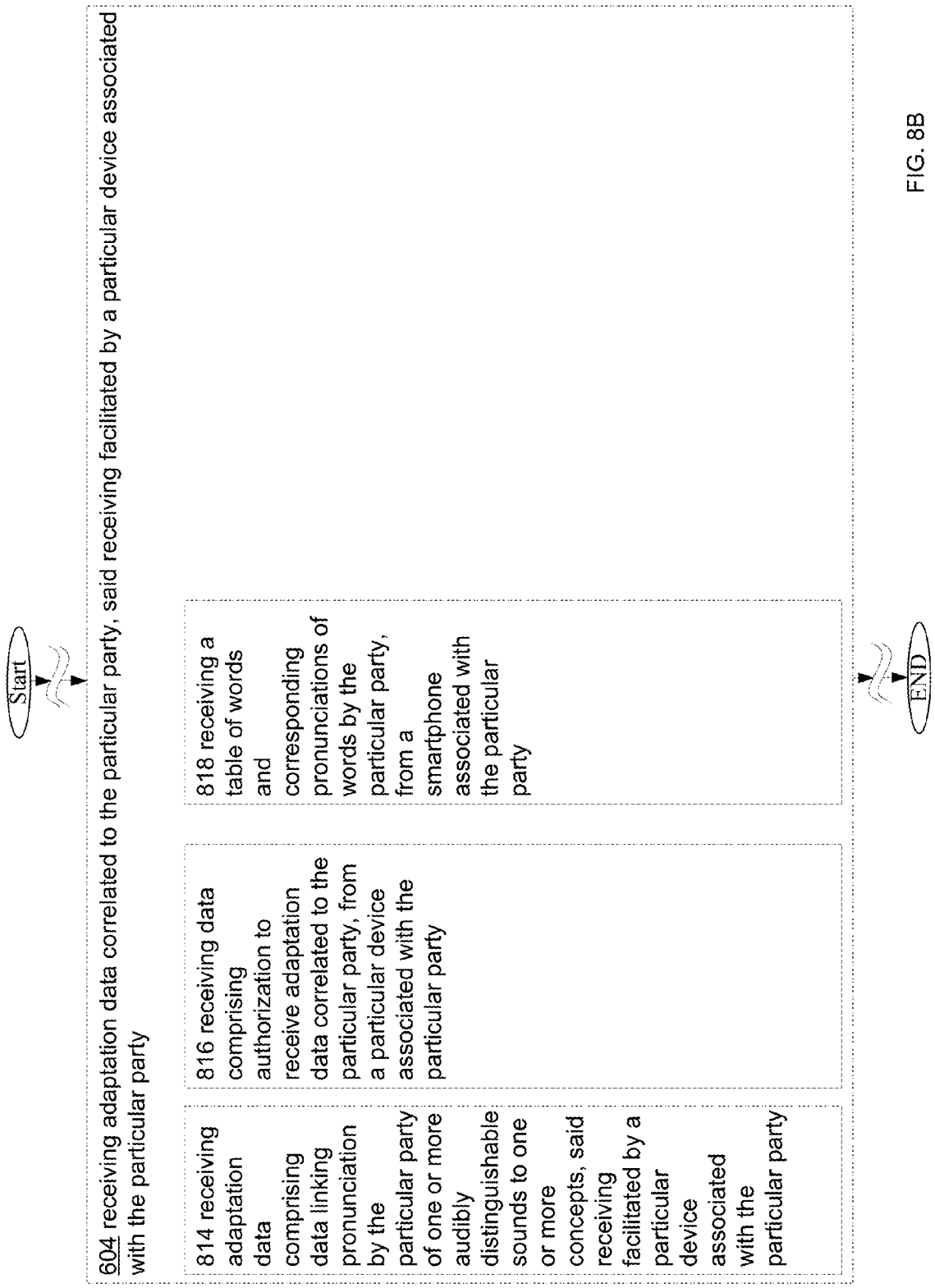
FIG. 8B is a high-level logic flowchart of a process depicting alternate implementations of the adaptation data receiving operation 504 of FIG. 6.

FIGS. 8A-8B depict various implementations of operation 604, according to embodiments. Referring now to FIG. 8A, operation 604 may include operation 802 depicting receiving adaptation data correlated to the particular party, said adaptation data received from the particular device. For example, FIG. 3 shows particular party-correlated adaptation data receiving from particular device module 302 receiving adaptation data (e.g., phoneme pronunciation information) correlated to the particular party (e.g., the phoneme pronunciation information is pronunciation information based on how the particular party, e.g., the user, pronounces the phoneme), said adaptation data received from the particular device (e.g., the smartphone carried by the user).

Referring again to FIG. 8A, operation 604 may include operation 804 depicting receiving adaptation data comprising at least one speech characteristic of the particular party, said adaptation data received from a location specified by the particular device. For example, FIG. 3 shows particular party-correlated adaptation data comprising particular party speech characteristics, adaptation data location receiving from particular device module 304 receiving adaptation data (e.g., pronunciation models of the ten words most commonly used by the particular party, e.g., a commonly traveled-to destination, e.g., "Washington D.C.") comprising at least one speech characteristic (e.g., words commonly spoken by the particular party), said adaptation data received from a location (e.g., a secured server location) specified by the particular device (e.g., the adaptation data storing device, e.g., the smart card carried in the user's wallet, specifies the secured server location from which the adaptation data is received).

Referring again to FIG. 8A, operation 604 may include operation 806 depicting receiving adaptation data comprising at least one speech characteristic of the particular party, wherein the particular device provides instructions for receiving the adaptation data. For example, FIG. 3 shows particular party-correlated adaptation data comprising particular party speech characteristics, adaptation data reception instruction receiving from particular device module 306 receiving adaptation data comprising at least one speech characteristic (e.g., utterance recognition information keyed to utterances by the particular party), wherein the particular device (e.g., glasses worn by the particular party that are configured to store, send, or receive information) provides instructions for receiving the adaptation data (e.g., a location, or a set of commands that will result in retrieval of the data, or a map of a server indicating where the data may be found and what authorizations are needed to find it).

Referring again to FIG. 8A, operation 604 may include operation 808 depicting receiving adaptation data comprising at least one speech characteristic of the particular party, said receiving facilitated by a particular device associated with the particular party. For example, FIG. 3 shows particular party speech characteristic receiving facilitated by particular party associated particular device module 308 receiving adaptation data (e.g., adaptable word templates) comprising at least one speech characteristic of the particular party (e.g., the user), said receiving facilitated by a particular device associated with the particular party (e.g., the user has a personal GPS navigation system that is put inside a motor vehicle, and the personal GPS navigation system facilitates the receiving of adaptation data, e.g., provides assistance in retrieving the adaptation data, e.g., the adaptable word templates).

Referring again to FIG. 8A, operation 604 may include operation 810 depicting receiving adaptation data comprising instructions for adapting one or more speech recognition components, said adaptation data received from a particular device associated with the particular party. For example, FIG. 3 shows particular party instruction for adapting a speech recognition component receiving facilitated by particular party associated particular device module 310 receiving adaptation data (e.g., a syllable recognition profile of the user), comprising instructions for adapting one or more speech recognition components (e.g., instructions for modifying the syllable recognition information of one or more speech recognition components the target device based on the syllable recognition profile), said adaptation data received from a particular device (e.g., a universal remote control) associated with the particular party (e.g., the universal remote control previously received the syllable recognition profile of the user, and may or may not have previously interacted with the user).

Referring again to FIG. 8A, operation 604 may include operation 812 depicting receiving adaptation data comprising data linking pronunciation of one or more phonemes by the particular party to one or more concepts, said receiving facilitated by a particular device associated with the particular party. For example, FIG. 3 shows particular party phoneme pronunciation concept linking data receiving facilitated by particular party associated particular device module 312 receiving adaptation data comprising data linking pronunciation of one or more phonemes (e.g., "/h/"/bcj/") by the particular party (e.g., the person involved in the speech-facilitated transaction) to one or more concepts (e.g., the phoneme "/s/" is linked to the letter "-s" appended at the end of a word), said receiving facilitated by particular device (e.g., an interface tablet carried by the user) associated with the particular party (e.g., the particular party is logged in as a user of the particular device).

Referring now to FIG. 8B, operation 606 may include operation 814 depicting receiving adaptation data comprising data linking pronunciation by the particular party of one or more audibly distinguishable sounds to one or more concepts, said receiving facilitated by a particular device associated with the particular party. For example, FIG. 3 shows particular party audibly distinguishable sound pronunciation concept linking data receiving facilitated by particular party associated particular device module 314 receiving adaptation data comprising data linking pronunciation (e.g., the way the user pronounces) of one or more audibly distinguishable sounds (e.g., phonemes or morphemes) by the particular party (e.g., the user, having logged into his work computer, attempting to train the work computer to the user's voice) to one or more concepts (e.g., combinations of phonemes and morphemes into words such as "open Microsoft Word," which opens the word processor for the user), said receiving facilitated by a particular device associated with the particular party (e.g., a USB "thumb" drive that is inserted into the work computer, such that the USB drive may or may not also include the user's credentials, verification, or login information), wherein the adaptation data is at least partly based on previous adaptation data (e.g., adaptation data derived from a previous training of a different computer) derived at least in part from one or more previous speech interactions of the particular party (e.g., the user previously trained on a different computer, which may or may not have been part of the enterprise solution, e.g., the computer could have been a home computer, or a computer from a different company, or from a different division of the same company).

Referring again to FIG. 8B, operation 606 may include operation 816 depicting receiving data comprising authorization to receive adaptation data correlated to the particular party, from a particular device associated with the particular party. For example, FIG. 3 shows authorization to receive adaptation data correlated to the particular party receiving from particular party associated particular device module 316 receiving data comprising authorization (e.g., an authorization code, or a data string that acts as a key) to receive adaptation data correlated to the particular party (e.g., consonant pronunciation information), from a particular device (e.g., an RFID tag sewn into a baseball cap worn by the user) associated with the particular party (e.g., the user is wearing the cap with the RFID tag).

Referring again to FIG. 8B, operation 606 may include operation 818 depicting receiving a table of at least one word and at least one corresponding pronunciation of the at least one word by the particular party, from a smartphone associated with the particular party. For example, FIG. 3 shows table of words and corresponding particular party pronunciations of words from smartphone receiving module 318 receiving a table of at least one word and corresponding pronunciation of at least one word (e.g., the word "tickets") by the particular party (e.g., the customer), from a smartphone associated with the particular party.

Figure 9A:
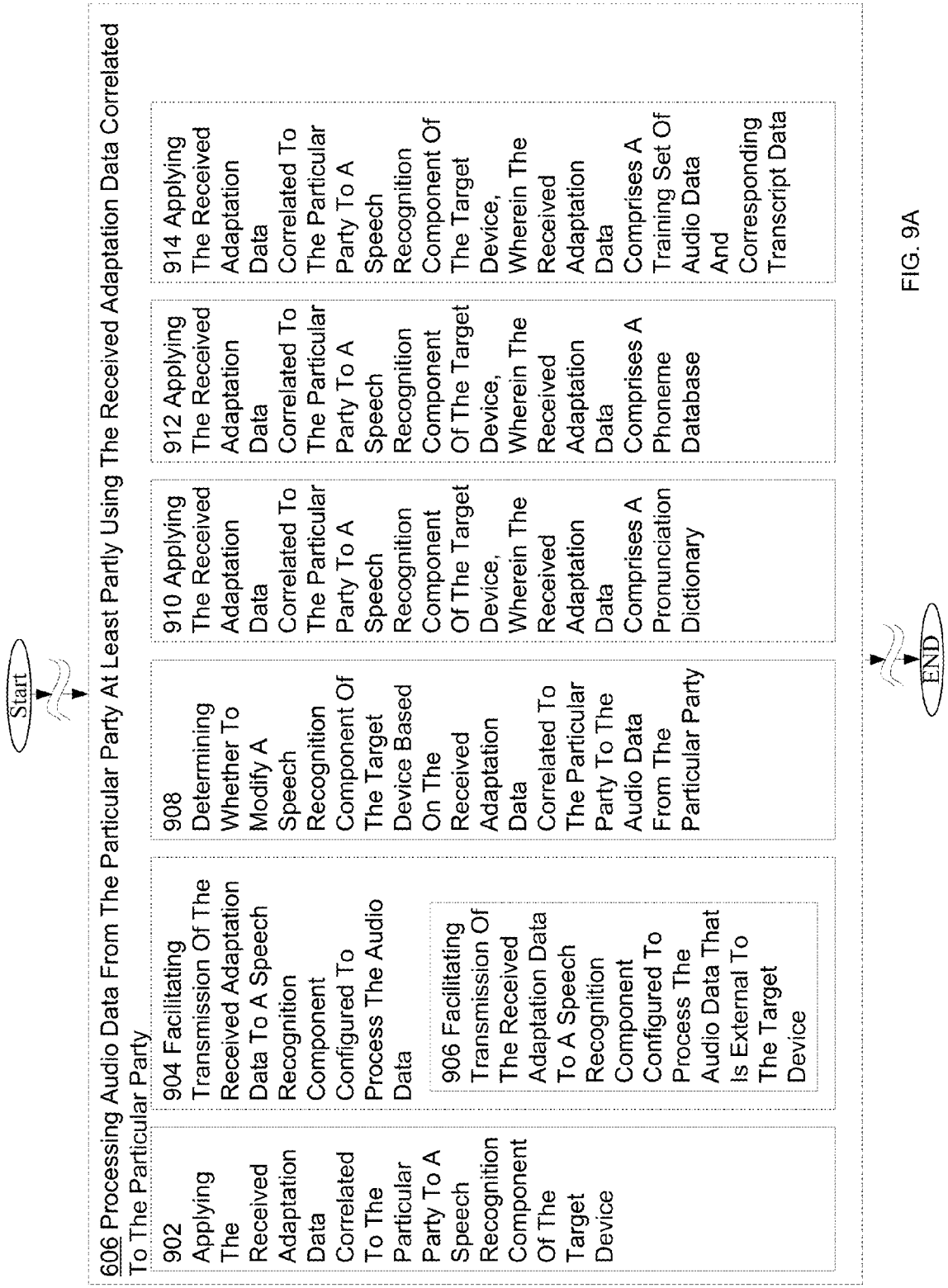
FIG. 9A is a high-level logic flowchart of a process depicting alternate implementations of the received adaptation data processing operation 506 of FIG. 6.

FIGS. 9A-9B depict various implementations of operation 606, according to embodiments. Referring now to FIG. 9A, operation 606 may include operation 902 depicting applying the received adaptation data correlated to the particular party to the audio data from the particular party. For example, FIG. 4 shows particular party applying received adaptation data to received audio data module 402 applying the received adaptation data (e.g., instructions for how to process speech by the particular party) correlated to the particular party (e.g., the user) to the audio data (e.g., the speech data) from the particular party (e.g., the user that is speaking).

Referring again to FIG. 9A, operation 606 may include operation 904 depicting facilitating transmission of the received adaptation data to a speech recognition component configured to process the audio data. For example, FIG. 4 shows transmission of received adaptation data to speech recognition component configured to process audio data facilitating module 404 facilitating transmission (e.g., carrying out at least one action which assists or helps assist in carrying out the task of transmitting) of the received adaptation data (e.g., instructions for modifying the artificial decision-making of a speech recognition module of a device in order to more quickly process speech from the particular party in the general case, e.g., it may improve performance of speech processing more often than not) to a speech recognition component (e.g., a component configured to perform at least one portion of the task of converting speech by the user into a recognizable command for a device) configured to process the audio data (e.g., perform at least one portion of a task of converting speech into a recognizable command).

Referring again to FIG. 9A, operation 904 may include operation 906 depicting facilitating transmission of the received adaptation data to a speech recognition component configured to process the audio data that is external to the target device. For example, FIG. 4 shows transmission of received adaptation data to target device-external speech recognition component configured to process audio facilitating module 406 facilitating transmission of the received adaptation data (e.g., facilitating transmission (e.g., carrying out at least one action which assists or helps assist in carrying out the task of transmitting) of the received adaptation data (e.g., a word acceptance algorithm tailored to the particular party, e.g., the user) to a speech recognition component (e.g., a software module of a computer) configured to process the audio data that is external to the target device (e.g., the software module and the computer are not part of the target device, which is a motor vehicle).

Referring again to FIG. 9A, operation 608 may include operation 908 depicting determining whether to modify a speech recognition component of the target device based on the received adaptation data correlated to the particular party. For example, FIG. 4 shows target device speech recognition component modification determining based on received adaptation data module 408 determining whether to modify (e.g., deciding whether to update, change, supplement, add on to, transform, or otherwise alter) a speech recognition component of the target device (e.g., a software and/or hardware module of the automated teller machine) based on the received adaptation data (e.g., instructions detailing how a decision tree of the speech recognition component could be changed, with the final determination in the hands of the target device, e.g., the automated teller machine) correlated to the particular party (e.g., the bank customer who is trying to use the automated teller machine).

Referring again to FIG. 9A, operation 608 may include operation 910 depicting applying the received adaptation data correlated to the particular party to a speech recognition component of the target device, wherein the received adaptation data comprises a pronunciation dictionary. For example, FIG. 4 shows received particular party pronunciation dictionary applying to audio data module 410 applying the received adaptation data (e.g., a pronunciation dictionary) correlated to the particular party (e.g., a pronunciation dictionary of the user pronouncing words) to a speech recognition component (e.g., a software or hardware module) of the target device (e.g., a video game system), wherein the received adaptation data comprises a pronunciation dictionary.

Referring again to FIG. 9A, operation 608 may include operation 912 depicting applying the received adaptation data correlated to the particular party to a speech recognition component of the target device, wherein the received adaptation data comprises a phoneme database. For example, FIG. 4 shows received particular party phoneme database applying to audio data module 412 applying the received adaptation data (e.g., a phoneme database) correlated to the particular party (e.g., the user) to a speech recognition component (e.g., a hardware or software module) of the target device (e.g., a home electronics clock radio), wherein the received adaptation data comprises a phoneme database.

Referring again to FIG. 9A, operation 608 may include operation 914 depicting applying the received adaptation data correlated to the particular party to a speech recognition component of the target device, wherein the received adaptation data comprises a training set of audio data and corresponding transcript data. For example, FIG. 4 shows received particular party audio data training set and transcript data applying to target device for interpreting audio data module 414 applying (e.g., using the training set to train a speech recognition component) the received adaptation data (e.g., the training set) correlated to the particular party (e.g., the user) to a speech recognition component of the target device (e.g., a motor vehicle), wherein the received adaptation data comprises a training set of audio data and corresponding transcript data Referring now to FIG. 9B, operation 608 may include operation 916 depicting applying the received adaptation data correlated to the particular party to a speech recognition component of the target device, wherein the received adaptation data comprises probability information of one or more words. For example, FIG. 4 shows received probability information of one or more words to target device speech recognition component applying module 416 applying the received adaptation data (e.g., probability information) correlated to the particular party to a speech recognition component (e.g., updating or modifying one or more decision trees of the speech recognition component based on the probability information) of the target device (e.g., the automated drive-thru system), wherein the received adaptation data comprises probability information of one or more words (e.g., if the user really liked cheese fries, the words "cheese fries" would have a high probability information).

Referring again to FIG. 9B, operation 608 may include operation 918 depicting processing received speech from the particular party at least partly using the received adaptation data correlated to the particular party. For example, FIG. 4 shows particular party speech processing using received adaptation data module processing received speech from the particular party (e.g., the user) at least partly using the received adaptation data (e.g., the best-model selection algorithm) correlated to the particular party.

Referring again to FIG. 9B, operation 918 may include operation 920 depicting processing received speech from the particular party at least partly using a received pronunciation dictionary correlated to the particular party. For example, FIG. 4 shows particular party speech processing using received pronunciation dictionary module 420 processing received speech (e.g., "print my ticket to Washington D.C.") from the particular party (e.g., the user) at least partly using a received pronunciation dictionary correlated to the particular party (e.g., the pronunciation dictionary includes the specific words "Washington D.C." as pronounced by the user).

Referring again to FIG. 9B, operation 920 may include operation 922 depicting replacing a pronunciation definition of at least one word stored in a pronunciation dictionary of the target device with a corresponding pronunciation definition of at least one word stored in the received pronunciation dictionary. For example, FIG. 4 shows replacing one or more word stored in target device pronunciation dictionary with one or more word stored in received pronunciation dictionary module 422 replacing a pronunciation definition of at least one word (e.g., "fifteen") stored in a pronunciation dictionary of the target device (e.g., an automated teller machine) with a corresponding pronunciation (e.g., a user-specific pronunciation) definition of at least one word stored in the received pronunciation dictionary (e.g., the received dictionary which includes the word "fifteen" and the user-specific pronunciation thereof).

Referring again to FIG. 9B, operation 920 may include operation 924 depicting processing the received speech using the pronunciation dictionary of the target device with the replaced pronunciation definition of the at least one word. For example, FIG. 4 shows speech processing with pronunciation dictionary having replaced pronunciation definition module 424 processing the received speech (e.g., "load Super Mario Bros.") using the pronunciation dictionary of the target device (e.g., the video game system) with the replaced pronunciation definition (e.g., the user's pronunciation definition replaces the default pronunciation definition for this speech-facilitated transaction) of the at least one word (e.g., "Mario").

Figure 10C:
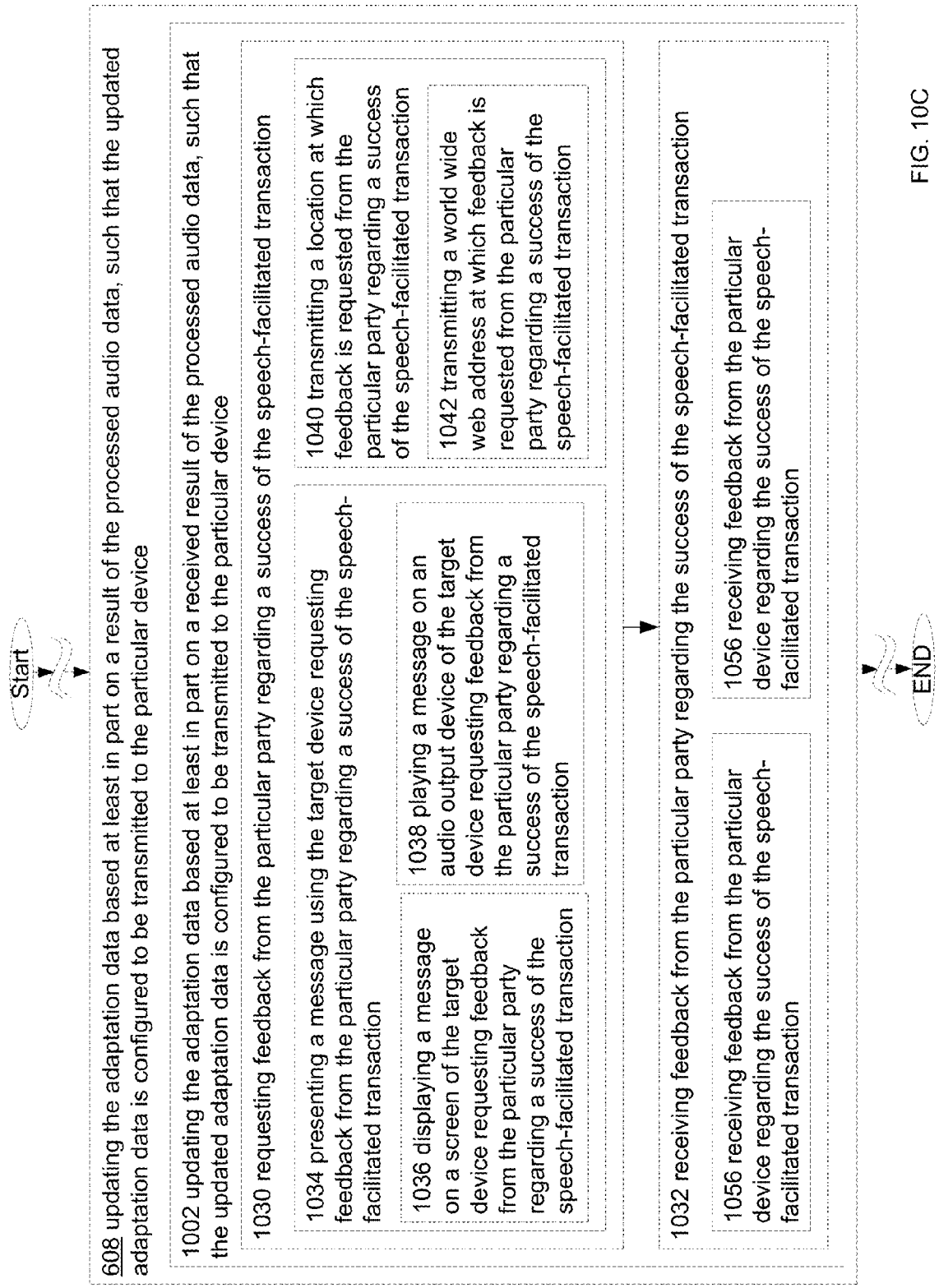
FIG. 10C is a high-level logic flowchart of a process depicting alternate implementations of an adaptation data updating operation 508 of FIG. 6.

FIGS. 10A-10K depict various implementations of operation 608, according to embodiments. Referring now to FIG. 10A, operation 608 may include operation 1002 depicting updating the adaptation data based at least in part on a received result of the processed audio data, such that the updated adaptation data is configured to be transmitted to the particular device. For example, FIG. 5 shows adaptation data configured to be transmitted to the particular device received result-based updating module 502 updating the adaptation data based at least in part updating the adaptation data (e.g., the user's specific model for commonly used words) based at least in part on a received result of the processed audio data (e.g., a listing of what words were spoken and how many times), such that the updated adaptation data (e.g., the adaptation data, for which one or more word pronunciations may be updated) is configured to be transmitted to the particular device (e.g., a device on the user's home network).

Referring again to FIG. 10A, operation 1002 may include operation 1004 depicting updating the adaptation data based at least in part on a received result of the processed audio data from a further device, such that the updated adaptation data is configured to be transmitted to the particular device. For example, FIG. 5 shows adaptation data configured to be transmitted to the particular device received from further device result-based updating module 504 updating the adaptation data (e.g., adaptation data derived from a previous training of a different computer) based at least in part on a received result of the processed audio data (e.g., determining how many edits the user had to make in the word processing document after the speech information is received and processed) from a further device (e.g., a different computer on the network that is monitoring the user's operations), such that the updated adaptation data (e.g., the adaptation data, but updated due to further training on the computer being used as the target device) to the particular device (e.g., a USB stick drive coupled to the computer).

Referring again to FIG. 10A, operation 1002 may include operation 1006 depicting updating the adaptation data based at least in part on a received result indicating a subjective opinion of the particular party regarding a success of the speech-facilitated transaction. For example, FIG. 5 shows adaptation data updating based on received result indicating particular party subjective opinion of success of transaction module 506 updating (e.g., changing or modifying the selection algorithm for the various speech models) the adaptation data e.g., example accuracy rates of various speech models previously used, so that a system can pick one that it desires based on accuracy rates and projected type of usage) based at least in part on a received result indicating a subjective opinion of the particular party (e.g., the user leaves feedback that 'the transaction was not easily conducted') regarding a success of the speech-facilitated transaction.

Referring again to FIG. 10A, operation 1006 may include operation 1008 depicting updating the adaptation data based at least in part on a received numerical representation of the subjective opinion of the particular party regarding a success of the speech-facilitated transaction. For example, FIG. 5 shows adaptation data updating based on received numerical representation of subjective opinion of particular party of success of transaction module 508 updating the adaptation data (e.g., speech model adaptation instructions) based at least in part on a received numerical representation (e.g., "two out of ten") of the subjective opinion ("the transaction was awful") of the particular party regarding a success of the speech-facilitated transaction.

Referring again to FIG. 10A, operation 1002 may include operation 1010 depicting updating the adaptation data based at least in part on a received result of the processed audio data from the particular party, such that the updated adaptation data is configured to be transmitted to the particular device. For example, FIG. 5 shows adaptation data updating based on result received from particular party module 510 updating the adaptation data (e.g., word acceptance algorithm tailored to the particular party) based at least in part on a received result of the processed audio data from the particular party (e.g., receiving the result of a survey asking for feedback from the particular party), such that the updated adaptation data is configured to be transmitted to the particular device (e.g., the user's smartphone).

Referring again to FIG. 10A, operation 1002 may include operation 1012 depicting updating the adaptation data based at least in part on a received result of the processed audio data from the particular device, such that the updated adaptation data is configured to be transmitted to the particular device. For example, FIG. 5 shows adaptation data updating based on result received from particular device module 512 updating the adaptation data (e.g., an expected response-based algorithm) based at least in part on a received result of the processed audio data from the particular device (e.g., the particular device solicits feedback from the user, and transmits it to the target device), such that the updated adaptation data is configured to be transmitted to the particular device (e.g., a headset).

Referring again to FIG. 10A, operation 1002 may include operation 1014 depicting updating the adaptation data based at least in part on a received result indicating the particular party's ranking of a success of the speech-facilitated transaction. For example, FIG. 5 shows adaptation data updating based on received result indicating particular party ranking of success of transaction module 514 updating the adaptation data (e.g., a best-model selection algorithm) based at least in part on a received result indicating the particular party's ranking of a success (e.g., at the end of the transaction, the automated drive-thru machine asks for a letter grade regarding a success of the transaction, and the user gives the transaction a "B") of the speech-facilitated transaction.

Referring again to FIG. 10A, operation 1002 may include operation 1016 depicting updating the adaptation data based at least in part on a received result indicating the particular party's ranking of success of a speech-facilitated portion of the speech-facilitated transaction. For example, FIG. 5 shows adaptation data updating based on received result indicating particular party ranking of success of a speech portion of the transaction module 516 updating the adaptation data (e.g., a word conversion hypothesizer) based at least in part on a received result (e.g., received from the particular device, which may query the user) indicating particular party ranking of success of a speech-facilitated portion (e.g., ranking the portion that was speech-facilitated) of the speech-facilitated transaction (e.g., printing out an airline ticket from an automated airline ticket dispenser).

Referring now to FIG. 10B, operation 1002 may include operation 1018 depicting updating the adaptation data based at least in part on a received result indicating a subjective state of the particular party after completing the speech-facilitated transaction. For example, FIG. 5 shows adaptation data updating based on received result indicating post-transaction particular party subjective state module 518 updating the adaptation data (e.g., pronunciation keys for the particular party saying commonly-used words) based at least in part on a received result indicating a subjective state of the particular party (e.g., a program running on a user's home computer infers or directly asks the user about the user's state of mind, and receives the answer "frustrated") after completing the speech-facilitated transaction (e.g., some time after the speech-facilitated transaction, e.g., the user withdraws money from a speech-enabled ATM, then goes home and uses the computer, and the computer directly asks or infers the mood from the user's interactions with the computer).

Referring again to FIG. 10B, operation 1002 may include operation 1020 depicting updating the adaptation data based at least in part on a received result from a social network website indicating the particular party's subjective state after completing the speech-facilitated transaction. For example, FIG. 5 shows adaptation data updating based on received result from social networking site indicating post-transaction particular party subjective state module 520 updating the adaptation data (e.g., pronunciation models of the ten words most commonly used to interact with the target device) based at least in part on a received result from a social network website (e.g., Facebook) indicating the particular party's subjective state (e.g., after the speech facilitated transaction, the user goes on to Facebook or twitter to post "Just got back from ordering my Western Bacon Chee . . . SO FRUSTRATED,") after completing the speech-facilitated transaction (e.g., the user orders a Western Bacon Chee from the automated drive-thru menu).

Referring again to FIG. 10B, operation 1002 may include operation 1022 depicting updating the adaptation data based at least in part on a received result from the particular device indicating the particular party's subjective state after completing the speech-facilitated transaction. For example, FIG. 5 shows adaptation data updating based on received result from particular device indicating post-transaction particular party subjective state module 522 updating the adaptation data (e.g., example accuracy rates of various speech models previously used, so that a system can pick one that it desires based on accuracy rates and projected type of usage) based at least in part on a received result (e.g., "the user is pleased") from the particular device (e.g., the video game controller) indicating the particular party's subjective state (e.g., the particular party is pleased) after completing the speech-facilitated transaction (e.g., the user successfully carried out speech actions in a video game).

Referring again to FIG. 10B, operation 1022 may include operation 1024 depicting updating the adaptation data based at least in part on a received result from the particular device indicating the particular party's subjective state inputted into the particular device by the particular party after completing the speech-facilitated transaction. For example, FIG. 5 shows adaptation data updating based on received result from particular device inputted by particular party indicating post-transaction particular party subjective state module 524 updating the adaptation data (e.g., speech model adaptation instructions) based at least in part on a received result from the particular device (e.g., the user's smartphone) indicating the particular party's subjective state (e.g., "thinks the transaction went well") inputted into the particular device (e.g., through feedback, whether directly queried or not) by the particular party (e.g., the user) after completing the speech-facilitated transaction (e.g., withdrawing money from an ATM).

Referring again to FIG. 10B, operation 1024 may include operation 1026 depicting updating the adaptation data based at least in part on a received result from the particular device indicating the particular party's subjective state inputted into the particular device by the particular party after completing the speech-facilitated transaction, in response to a request for feedback. For example, FIG. 5 shows adaptation data updating based on received result from particular device inputted by particular party in response to request for feedback indicating post-transaction particular party subjective state module 526 updating the adaptation data (e.g., a word acceptance algorithm tailored to the particular party, e.g., the user) based at least in part on a received result from the particular device (e.g., the user's home computer residing on a home network) indicating the particular party's subjective state (e.g., "unhappy") inputted into the particular device by the particular party (e.g., the user) after completing the speech-facilitated transaction (e.g., customizing settings on a Blu-Ray player in a home network), in response to a request for feedback (e.g., the home computer opens up a survey in response to the user's experience in commanding a Blu-Ray player to play a disc using speech commands).

Referring again to FIG. 10B, operation 1002 may include operation 1028 depicting updating the adaptation data based at least in part on a received result indicating the particular party's determination of quality of the speech-facilitated transaction in response to a query regarding the success of the speech-facilitated transaction. For example, FIG. 5 shows adaptation data updating based on received result indicating post-transaction particular party determination of transaction quality module 528 updating the adaptation data (e.g., a probabilistic word model based on that particular user and the target device to which the user is interacting, which is a subset of the total adaptation data facilitated by the particular device, which may include a library of probabilistic word models for different target devices, e.g., different models for an ATM machine and a DVD player) based at least in part on a received result (e.g., "the user rated this transaction as 40% efficient") indicating the particular party's determination of quality of the speech-facilitated transaction (e.g., using speech to create a word processing document in an enterprise office setting) in response to a query regarding the success of the speech-facilitated transaction (e.g., after the document is saved, closed, or emailed, the enterprise computer directs the user to a module that allows the particular party to input his or her determination of the quality of the speech-facilitated transaction).

Referring now to FIG. 10C, operation 1002 may include operation 1030 depicting requesting feedback from the particular party regarding a success of the speech-facilitated transaction. For example, FIG. 5 shows success of speech-facilitated transaction feedback requesting from particular party module 530 requesting feedback from the particular party (e.g., the user) regarding a success of the speech-facilitated transaction (e.g., operating a home theater system using a combination of speech and a universal remote control that stores, transmits, and receives adaptation data).

Referring again to FIG. 10C, operation 1002 may include operation 1032 depicting receiving feedback from the particular party regarding the success of the speech-facilitated transaction. For example, FIG. 5 shows particular party feedback regarding success of speech facilitated transaction receiving module 532 receiving feedback (e.g., receiving data) from the particular party (e.g., the user) regarding the success of the speech facilitated transaction e.g., operating a home theater system using a combination of speech and a universal remote control that stores, transmits, and receives adaptation data).

Referring again to FIG. 10C, operation 1030 may include operation 1034 depicting presenting a message using the target device requesting feedback from the particular party regarding a success of the speech-facilitated transaction. For example, FIG. 5 shows message requesting feedback from particular party regarding speech-facilitated transaction success presenting on target device module 534 presenting a message (e.g., displaying the message "please rate the transaction using the below buttons") using the target device (e.g., displaying the message on a screen of the ATM) requesting feedback (e.g., input regarding the transaction) from the particular party (e.g., the user) regarding a success (e.g., how easy was the transaction to complete and was it completed successfully) of the speech-facilitated transaction (e.g., withdrawing money from the ATM).

Referring again to FIG. 10C, operation 1034 may include operation 1036 depicting displaying a message on a screen of the target device requesting feedback from the particular party regarding a success of the speech-facilitated transaction. For example, FIG. 5 shows message requesting feedback from particular party regarding speech-facilitated transaction success displaying on target device screen module 536 displaying a message (e.g. "please rate the effectiveness of the speech transactions") on a screen of the target device (e.g., on a portable GPS navigation system) requesting feedback (e.g., input regarding the transaction) from the particular party (e.g., the user) regarding a success of the speech-facilitated transaction (e.g., speaking an address to the system).

Referring again to FIG. 10C, operation 1034 may include operation 1038 depicting playing a message on an audio output device of the target device requesting feedback from the particular party regarding a success of the speech-facilitated transaction. For example, FIG. 5 shows message requesting feedback from particular party regarding speech-facilitated transaction success playing on target device audio output module 538 playing a message (e.g., "please provide feedback regarding this transaction") on an audio output device (e.g., a speaker) of the target device (e.g., the audio/visual receiver) requesting feedback from the particular party (e.g., the user) regarding a success of the speech-facilitated transaction (e.g., configuring the audio/visual receiver (e.g., calibrating the speakers) using speech commands (e.g., standing in a particular portion of the room and speaking commands regarding the sound configuration).

Referring again to FIG. 10C, operation 1030 may include operation 1040 depicting transmitting a location at which feedback is requested from the particular party regarding a success of the speech-facilitated transaction. For example, FIG. 5 shows location of request for particular party speech-facilitated transaction feedback transmitting module 540 transmitting a location (e.g., a location on an office network, either physical or virtual) at which feedback is requested (e.g., a survey is generated) from the particular party (e.g., the user) regarding a success of the speech-facilitated transaction (e.g., using speech to perform tasks in an enterprise work environment).

Referring again to FIG. 10C, operation 1040 may include operation 1042 depicting transmitting a world wide web address at which feedback is requested from the particular party regarding a success of the speech-facilitated transaction. For example, FIG. 5 shows world wide web address of request for particular party speech-facilitated transaction feedback transmitting module 542 transmitting a world wide web address (e.g., playing an address over a speaker of the phone for the user to hear (e.g., "to complete a survey regarding this transaction, go to "http://www.myspeechsurvey.com") at which feedback is requested from the particular party (e.g., the user) regarding a success of the speech-facilitated transaction (e.g., using a smartphone to interact with an automated voice system).

Referring now to FIG. 10D, operation 1030 may include operation 1044 depicting requesting feedback in a form of speech from the particular party regarding a success of the speech-facilitated transaction. For example, FIG. 5 shows success of speech-facilitated transaction speech feedback requesting from particular party module 546 requesting feedback in a form of speech (e.g., "say how you would rate this transaction from one to ten") from the particular party (e.g., the user) regarding a success of the speech-facilitated transaction.

Referring again to FIG. 10D, operation 1030 may include operation 1046 depicting requesting feedback from the particular party without using speech regarding a success of the speech-facilitated transaction. For example, FIG. 5 shows success of speech-facilitated transaction non-speech feedback requesting from particular party module 546 requesting feedback from the particular party without using speech (e.g., "please press a key on the keypad indicating a rating of this transaction from zero to nine, with zero being the lowest and nine the highest) regarding a success of the speech-facilitated transaction (e.g., ordering a backpack using an automated online ordering service).

Referring again to FIG. 10D, operation 1030 may include operation 1048 depicting sending a message to the particular device requesting feedback from the particular party regarding a success of the speech-facilitated transaction. For example, FIG. 5 shows sending a message requesting feedback regarding speech-facilitated transaction to particular device module 548 sending a message to the particular device (e.g., a user's cell phone) requesting feedback from the particular party (e.g., the user) regarding a success of the speech-facilitated transaction (e.g., withdrawing money from an automated ATM).

Referring again to FIG. 10D, operation 1030 may include operation 1050 depicting transmitting a message configured to be presented on the particular device requesting feedback from the particular party regarding a success of the speech-facilitated transaction. For example, FIG. 5 shows sending a message configured to be presented on the particular device and requesting feedback regarding speech-facilitated transaction module 550 sending a message (e.g., "Please say yes after one of the following options that best describes your feelings regarding the previous transaction") configured to be presented (e.g., read to the user) requesting feedback from the particular party (e.g., the user) regarding a success of the speech-facilitated transaction (e.g., using a headset to command a home theater system).

Referring again to FIG. 10D, operation 1030 may include operation 1052 depicting sending a request to the particular device requesting presentation of a message requesting feedback from the particular party regarding a success of the speech facilitated transaction. For example, FIG. 5 shows sending a request for particular device to present message requesting feedback regarding speech-facilitated transaction module 552 sending a request to the particular device (e.g., a user's smartphone) requesting presentation of a message (e.g., "Please rate the experience of the previous transaction") requesting feedback (e.g., requesting that the person enter their thoughts) from the particular party (e.g., the user) regarding a success of the speech-facilitated transaction (e.g., receiving information from an automated receptionist).

Referring again to FIG. 10D, operation 1030 may include operation 1054 depicting requesting a numerical score feedback from the particular party regarding a success of the speech-facilitated transaction. For example, FIG. 5 shows numeric score feedback from particular party requesting module 554 requesting a numerical score (e.g., verbally requesting that the user speak a score from 1 to 100 after the transaction is completed) from the particular party (e.g., the user) regarding a success of the speech-facilitated transaction (e.g., placing an order at an automated drive-thru).

Referring back to FIG. 10C, operation 1032 may include operation 1056 depicting receiving feedback from the particular device regarding the success of the speech-facilitated transaction. For example, FIG. 5 (e.g., FIG. 5C) shows particular party feedback regarding success of speech facilitated transaction receiving from particular device module 556 receiving feedback (e.g., "this transaction was successful") from the particular device (e.g., the key ring device) regarding the success of the speech-facilitated transaction (e.g., instructing the motor vehicle to lower the windows).

Referring back again to FIG. 10C, operation 1032 may include operation 1058 depicting receiving feedback from a further device regarding the success of the speech-facilitated transaction. For example, FIG. 5 (e.g., FIG. 5C) shows particular party feedback regarding success of speech facilitated transaction receiving from a further device module 558 receiving feedback from a further device (e.g., on an enterprise network, a separate device or software module monitors the speech-facilitated transactions and determines their success) regarding the success of the speech-facilitated transaction.

Figure 10E:
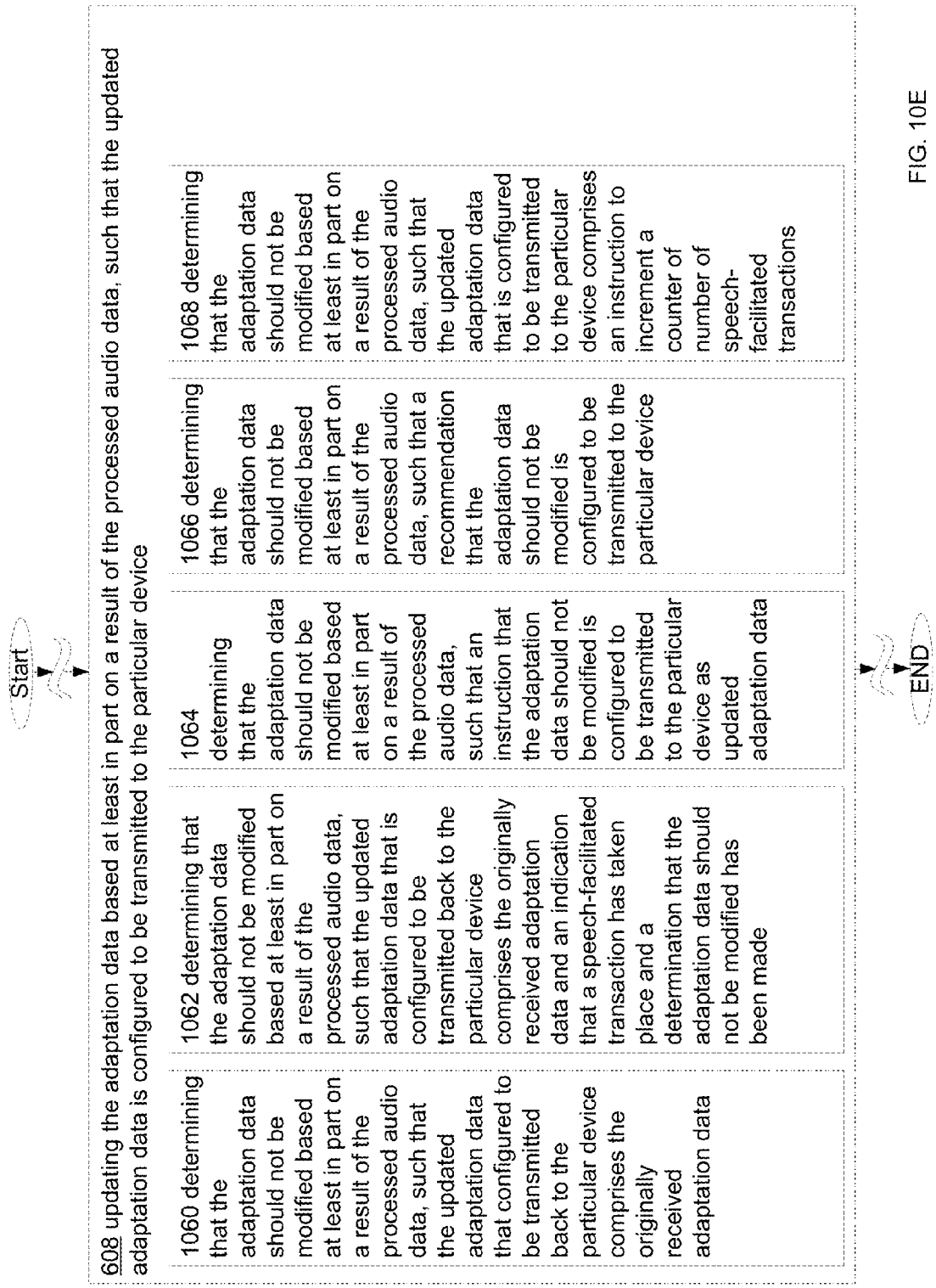
FIG. 10E is a high-level logic flowchart of a process depicting alternate implementations of an adaptation data updating operation 508 of FIG. 6.

Referring now to FIG. 10E, operation 608 may include operation 1060 depicting determining that the adaptation data should not be modified based at least in part on a result of the processed audio data, such that the updated adaptation data that is configured to be transmitted back to the particular device comprises the originally received adaptation data. For example, FIG. 5 shows determining not to modify adaptation data and configuring original adaptation data to be transmitted back to particular device as updated adaptation data module 560 determining that the adaptation data (e.g., an expected response-based algorithm) should not be modified based at least in part on a result of the processed audio data (e.g., the result was an efficient operation that was assisted well by the inclusion of adaptation data), such that the updated adaptation data that is configured to be transmitted back to the particular device (e.g., the customized USB stick) comprises the originally received adaptation data (e.g., the same expected response-based algorithm).

Referring again to FIG. 10E, operation 608 may include operation 1062 depicting determining that the adaptation data should not be modified based at least in part on a result of the processed audio data, such that the updated adaptation data that is configured to be transmitted back to the particular device comprises the originally received adaptation data and an indication that a speech-facilitated transaction has taken place and a determination that the adaptation data should not be modified has been made. For example, FIG. 5 shows determining not to modify adaptation data and configuring original adaptation data and indication that a speech-facilitated transaction has taken place to be transmitted back to particular device as updated adaptation data module 562 determining that the adaptation data (e.g., the pronunciation dictionary) should not be modified based at least in part on a result of the processed audio data (e.g., the conversion of speech into a device-comprehensible instruction was successful, as measured by one or more of objective or subjective indicia), such that the updated adaptation data (e.g., which includes now the original adaptation data and an indication) that is configured to be transmitted back to the particular device (e.g., the smartphone) comprises the originally received adaptation data (e.g., the pronunciation dictionary) and an indication that a speech-facilitated transaction has taken place (e.g., an incrementing of a counter, or an instruction to increment a counter) and a determination that the adaptation data should not be modified has been made (e.g., a Boolean flag representing whether to modify the adaptation data, that is set to "false").

Referring again to FIG. 10E, operation 608 may include operation 1064 depicting determining that the adaptation data should not be modified based at least in part on a result of the processed audio data, such that an instruction that the adaptation data should not be modified is configured to be transmitted to the particular device as updated adaptation data. For example, FIG. 5 shows transmitting an instruction indicating that the adaptation data should not be modified as updated adaptation data based on a determination module 564 determining that the adaptation data (e.g., a phoneme database) should not be modified based at least in part on a result of the processed audio data (e.g., the user provided a score of "10" out of a possible "10" as feedback for smoothness of the transaction), such that an instruction that the adaptation data should not be modified is configured to be transmitted to the particular device (e.g., the universal remote control) as updated adaptation data.

Referring again to FIG. 10E, operation 608 may include operation 1066 depicting determining that the adaptation data should not be modified based at least in part on a result of the processed audio data, such that a recommendation that the adaptation data should not be modified is configured to be transmitted to the particular device. For example, FIG. 5 shows determining that the adaptation data should not be modified and transmitting a recommendation not to modify adaptation data as updated adaptation data module 566 determining that the adaptation data (e.g., the training set of at least one word and a pronunciation of the at least one word) should not be modified based at least in part on a result of the processed audio data (e.g., the proper interpretation confidence rate of the target device stayed above 75% for the entire transaction), such that a recommendation that the adaptation data should not be modified (e.g., a recommendation that can be transmitted in electronic form is sent, but the particular device ultimately decides whether to actually modify the data, e.g., the particular device may have calculated a different proper interpretation confidence rate) is configured to be transmitted to the particular device (e.g., a headset for use with a video game system).

Referring again to FIG. 10E, operation 608 may include operation 1068 depicting determining that the adaptation data should not be modified based at least in part on a result of the processed audio data, such that the updated adaptation data that is configured to be transmitted to the particular device comprises an instruction to increment a counter of number of speech-facilitated transactions. For example, FIG. 5 shows determining that the adaptation data should not be modified and transmitting an instruction to increment a speech-facilitated transaction counter as updated adaptation data module 568 determining that the adaptation data (e.g., word weighting data) should not be modified based at least in part on a result of the processed audio data (e.g., not enough words were spoken during the transaction to justify modification of the word weighting data), such that the updated adaptation data that is configured to be transmitted to the particular device (e.g., a headset for use with a computer system) comprises an instruction to increment a counter of number of speech-facilitated transactions (e.g., the headset receives the instruction and increments the counter, which the computer system may or may not have access to, and the incrementing of the counter may indicate to the headset that the adaptation data should not be modified).

Referring now to FIG. 10F, operation 608 may include operation 1070 depicting updating the adaptation data based at least in part on a determined result of the processed audio data, such that the updated adaptation data is configured to be transmitted to the particular device. For example, FIG. 5 shows adaptation data updating based at least in part on determined result module 570 updating (e.g., changing a value in a table of) the adaptation data (e.g., a word confidence factor lookup table) based at least in part on a determined result of the processed audio data (e.g., a result of how many times each word in the speech-facilitated transaction appeared), such that the updated adaptation data (e.g., the word confidence factor lookup table with updated values) is configured to be transmitted to the particular device (e.g., a smartphone).

Referring again to FIG. 10F, operation 1070 may include operation 1072 depicting updating the adaptation data based at least in part on a result calculated by an inferred success of the speech-facilitated transaction, such that the updated adaptation data is configured to be transmitted to the particular device. For example, FIG. 5 shows adaptation data updating based at least in part on result calculated by inferred success of speech-facilitated transaction module 572 updating the adaptation data (e.g., a pronunciation dictionary including a pronunciation of the word "twenty") based at least in part on a result calculated by an inferred success of the speech-facilitated transaction (e.g., because the automated teller machine had to ask the amount of the deposit six times, the device infers that that portion of the speech-facilitated transaction, though ultimately successful, could have been more successful), such that the updated adaptation data (e.g., the pronunciation dictionary with a different pronunciation of the word "twenty" stored therein) is configured to be transmitted to the particular device (e.g., the smartphone).

Referring again to FIG. 10F, operation 1072 may include operation 1074 depicting updating the adaptation data based at least in part on a result calculated by an inferred success of the speech-facilitated transaction, inferred from at least one characteristic of the received speech from the particular party. For example, FIG. 5 shows adaptation data updating based at least in part on result calculated by inferred success of speech-facilitated transaction that is inferred from at least one speech characteristic of received speech module 574 updating the adaptation data (e.g., pronunciations of words commonly mispronounced or pronounced strangely by the user) based at least in part on a result (e.g., "poor communication") calculated by an inferred success (e.g., the device infers that the user was frustrated by the speech-facilitated transaction) of the speech-facilitated transaction (e.g., ordering cheese fries from an automated drive-thru window), inferred from at least one characteristic (e.g., a tone of voice used by the particular party, e.g., frustrated) of the received speech from the particular party (e.g., the user).

Referring again to FIG. 10F, operation 1074 may include operation 1076 depicting updating the adaptation data based at least in part on a result calculated by an inferred success of the speech-facilitated transaction, inferred from a type of word used in the received speech from the particular party. For example, FIG. 5 shows adaptation data updating based at least in part on result calculated by inferred success of speech-facilitated transaction that is inferred from a type of word in received speech module 576 updating (e.g., making the discourse marker ignoring algorithm more coarse, e.g., finding more elements as discourse markers) the adaptation data (e.g., a discourse marker ignoring algorithm) based at least in part on a result (e.g., "great") calculated by an inferred success (e.g., inferred that the transaction went well) of the speech-facilitated transaction (e.g., printing an airline ticket from an airline ticket dispensing device), inferred from a type of word used in the received speech from the particular party (e.g., the particular party says words like "thanks," "great," or "this was easy," which in some instances may be in response to prompts from the device, which may or may not directly ask about the user's impression of the transaction).

Referring again to FIG. 10F, operation 1074 may include operation 1078 depicting updating the adaptation data based at least in part on a result calculated by an inferred success of the speech-facilitated transaction, inferred from a tone of voice used in the received speech from the particular party. For example, FIG. 5 shows adaptation data updating based at least in part on result calculated by inferred success of speech-facilitated transaction that is inferred from a tone of voice in received speech module 578 updating (e.g., changing which model is the best for the condition currently experienced, e.g., "noisy") the adaptation data (e.g., a best-model selection algorithm) based at least in part on a result calculated by an inferred success of the speech-facilitated transaction (e.g., using an automated teller machine at a football game), inferred from a tone of voice (e.g., frustrated) used in the received speech from the particular party (e.g., the user).

Referring again to FIG. 10F, operation 1074 may include operation 1080 depicting updating the adaptation data based at least in part on a result calculated by an inferred success of the speech-facilitated transaction, inferred from a number of times a portion of the speech-facilitated transaction was repeated. For example, FIG. 5 shows adaptation data updating based at least in part on result calculated by inferred success of speech-facilitated transaction that is inferred from a number of times words are repeated in received speech module 580 updating the adaptation data (e.g., a continuous word recognition algorithm) based at least in part on a result calculated by an inferred success (e.g., determining the success without directly asking the user to rate the success of the transaction) of the speech-facilitated transaction (e.g., recognizing speech commands to throw grenades in a war game running on a video game console), inferred from a number of times a portion of the speech-facilitated transaction was repeated (e.g., how many times did the user say the words "throw grenade" before the system responded and caused the in-game character to throw the grenade). In some embodiments, the updated adaptation data may be configured to be transmitted to the particular device, e.g., the video game controller.

Figure 10G:
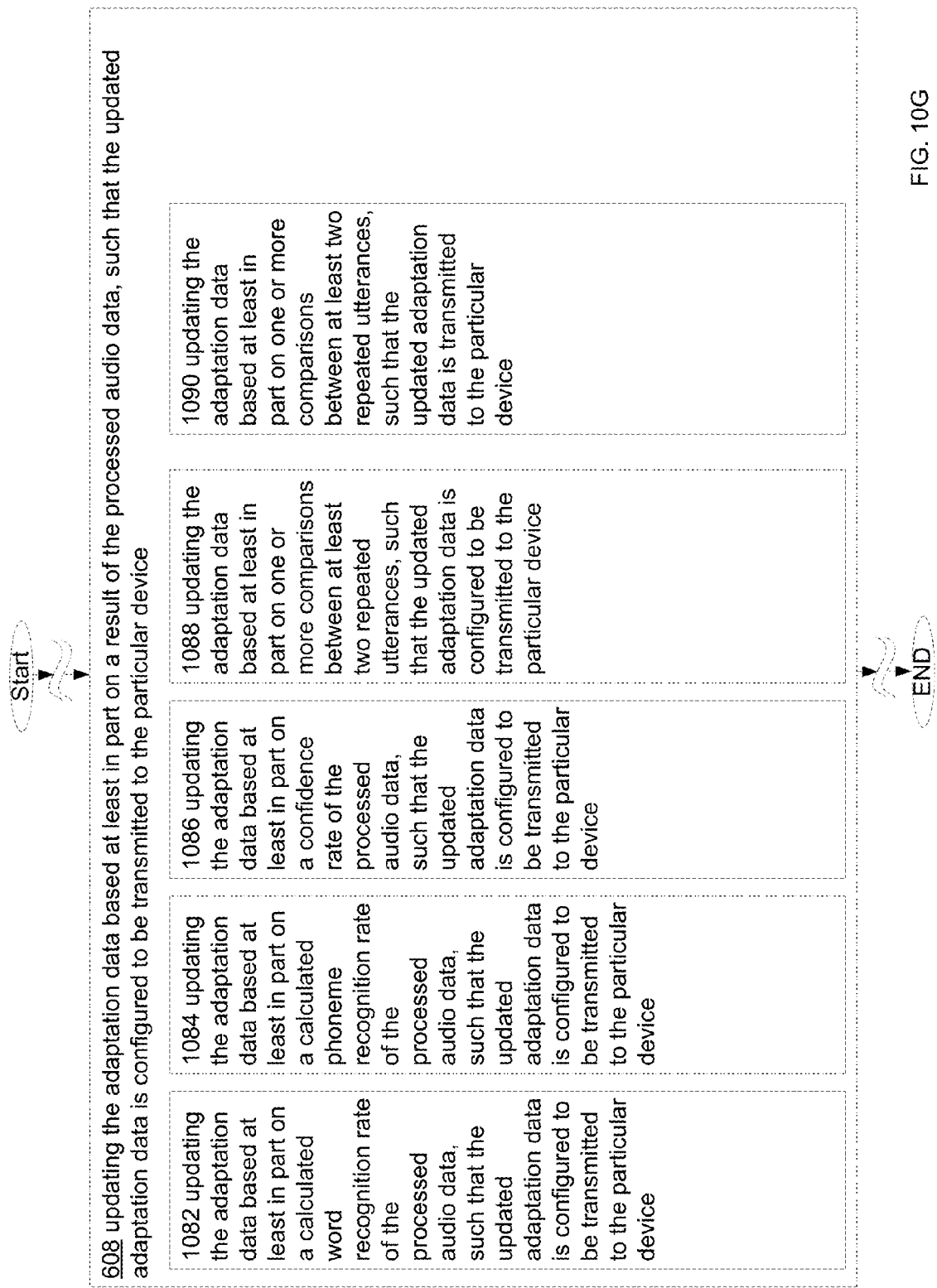
FIG. 10G is a high-level logic flowchart of a process depicting alternate implementations of an adaptation data updating operation 508 of FIG. 6.

Referring now to FIG. 10G, operation 608 may include operation 1082 depicting updating the adaptation data based at least in part on a calculated word recognition rate of the processed audio data, such that the updated adaptation data is configured to be transmitted to the particular device. For example, FIG. 5 shows adaptation data updating based at least in part on calculated word recognition rate of processed audio data module 582 updating the adaptation data (e.g., a condition-relative word frequency database) based at least in part on a calculated word recognition rate of the processed audio data (e.g., a recognition rate for each word recognized), such that the updated adaptation data (e.g., the condition-relative word frequency database is updated with word frequency information) is configured to be transmitted to the particular device (e.g., the key ring device which also functions as a motor vehicle key).

Referring again to FIG. 10G, operation 608 may include operation 1084 depicting updating the adaptation data based at least in part on a calculated phoneme recognition rate of the processed audio data, such that the updated adaptation data is configured to be transmitted to the particular device. For example, FIG. 5 shows adaptation data updating based at least in part on calculated phoneme recognition rate of processed audio data module 584 updating the adaptation data (e.g., a noisy-environment phoneme pronunciation database) based at least in part on a calculated phoneme recognition rate of the processed audio data, such that the updated adaptation data (e.g., the noisy-environment phoneme database, which may include updating pronunciation of one or more phonemes) is configured to be transmitted to the particular device (e.g., the user's smartphone).

Referring again to FIG. 10G, operation 608 may include operation 1086 depicting updating the adaptation data based at least in part on a confidence rate of the processed audio data, such that the updated adaptation data is configured to be transmitted to the particular device. For example, FIG. 5 shows adaptation data updating based at least in part on calculated confidence rate of processed audio data module 586 updating the adaptation data (e.g., a syllabic pronunciation database) based at least in part on a confidence rate of the processed audio data (e.g., a rate indicating the system's estimation of how likely it is that the system correctly parsed the received audio data), such that the updated adaptation data (e.g., the syllabic pronunciation database, which in this example, may be updated if the speech-facilitated transaction had a sufficiently high confidence rate) is configured to be transmitted to the particular device (e.g., a tablet device carried by the user).

Referring again to FIG. 10G, operation 608 may include operation 1088 depicting updating the adaptation data based at least in part on one or more comparisons between at least two repeated utterances, such that the updated adaptation data is configured to be transmitted to the particular device. For example, FIG. 5 shows updating adaptation data based at least in part on comparisons between at least two repeated utterances detected in the processed audio data and configuring updated adaptation data for transmission to particular device module 588 updating the adaptation data (e.g., a speech deviation algorithm for words often said in stressful conditions) based at least in part on one or more comparisons between at least two repeated utterances (e.g., comparing when the phrase "lock safe door" was said at two different times, either in the same transaction or in different transactions, in order to determine if the speech deviation algorithm is performing effectively, and to help determine whether to modify the speech deviation algorithm), such that the updated adaptation data is configured to be transmitted to the particular device (e.g., in this case, a bracelet that acts as a security device and that can store, receive, or transmit data).

Referring again to FIG. 10G, operation 608 may include operation 1090 depicting updating the adaptation data based at least in part on a result of the processed audio data, such that the updated adaptation data is transmitted to the particular device. For example, FIG. 5 shows transmitting updated adaptation data to particular device, said updating based at least in part on comparisons between at least two repeated utterances detected in the processed audio data module 590 updating the adaptation data (e.g., pronunciation keys for the particular party saying commonly-used words) based at least in part on a result of the processed audio data (e.g., the user rating of a success of the transaction), such that the updated adaptation data is transmitted to the particular device (e.g., the headset worn by the user).

Figure 10H:
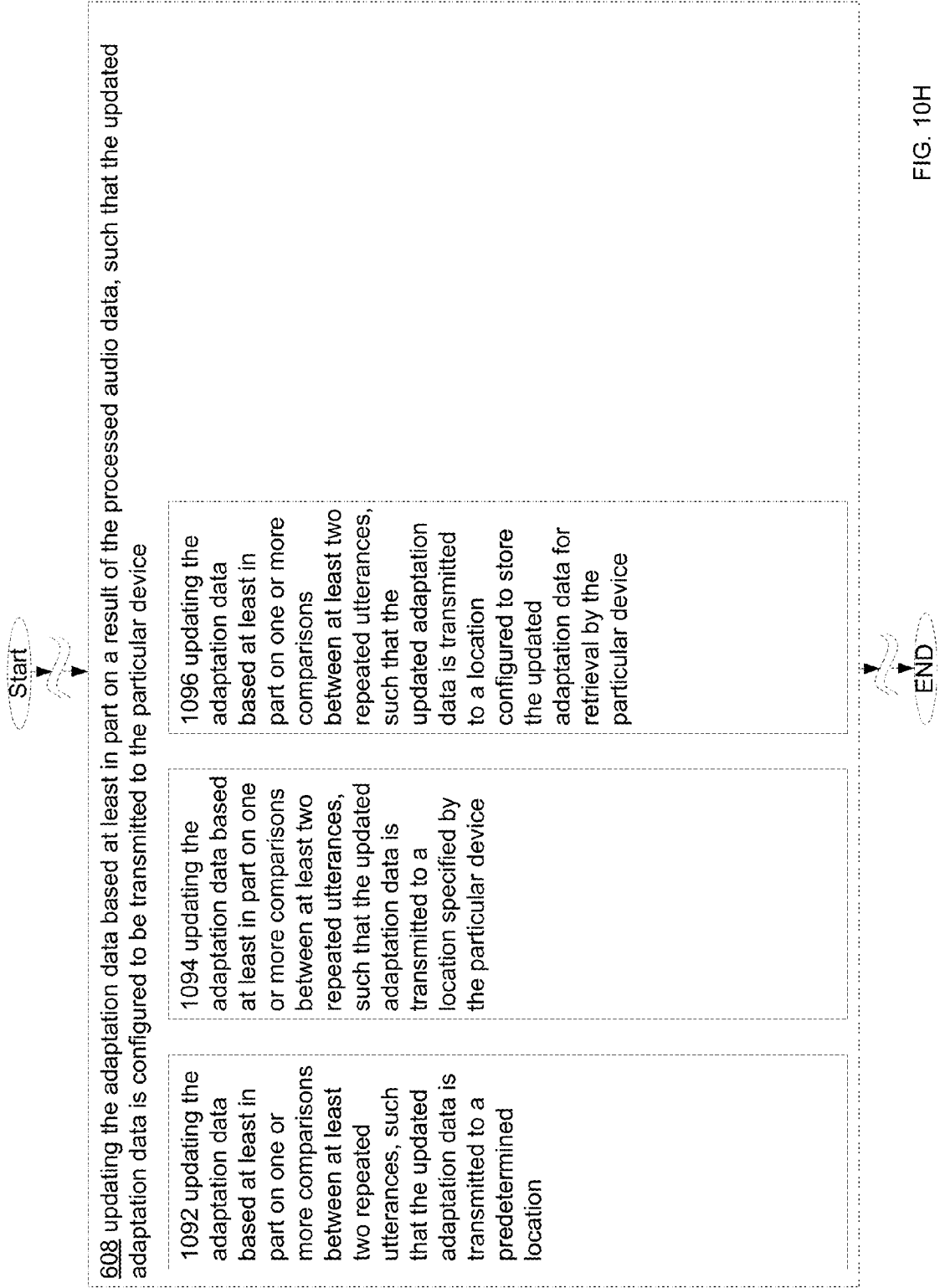
FIG. 10H is a high-level logic flowchart of a process depicting alternate implementations of an adaptation data updating operation 508 of FIG. 6.

Referring now to FIG. 10H, operation 608 may include operation 1092 depicting updating the adaptation data based at least in part on a result of the processed audio data, such that the updated adaptation data is transmitted to a predetermined location. For example, FIG. 5 shows transmitting updated adaptation data to predetermined location, said updating based at least in part on comparisons between at least two repeated utterances detected in the processed audio data module 592 updating the adaptation data base at least in part on a result of the processed audio data (e.g., a success of the transaction as inferred by the target device, e.g., the automated teller machine), such that the updated adaptation data is transmitted to a predetermined location (e.g., a server, e.g., Amazon.com's user cloud drive).

Referring again to FIG. 10H, operation 608 may include operation 1094 depicting updating the adaptation data based at least in part on a result of the processed audio data, such that the updated adaptation data is transmitted to a location specified by the particular device. For example, FIG. 5 shows transmitting updated adaptation data to location specified by particular device, said updating based at least in part on comparisons between at least two repeated utterances detected in the processed audio data module 594 updating the adaptation data (e.g., pronunciation models of the ten words most commonly used to interact with the target device) based at least in part on a result of the processed audio data, such that the updated adaptation data is transmitted to a location (e.g., an undisclosed server location) specified by the particular device (e.g., a user's smartphone).

Referring again to FIG. 10H, operation 608 may include operation 1096 depicting updating the adaptation data based at least in part on a result of the processed audio data, such that the updated adaptation data is transmitted to a location configured to store the updated adaptation data for retrieval by the particular device. For example, FIG. 5 shows transmitting updated adaptation data to retrieval-configured location said updating based at least in part on comparisons between at least two repeated utterances detected in the processed audio data module 596 updating the adaptation data (e.g., the way the user pronounces particular words) based at least in part on a result of the processed audio data, such that the updated adaptation data is transmitted to a location configured to store the updated adaptation data for retrieval (e.g., a server hosted by a provider of a communication network for a smartphone) by the particular device (e.g., a smartphone).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/ converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/ communication systems.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "capable of being operably coupled", to each other to achieve the desired functionality. Specific examples of operably coupled include but are not limited to physically mateable and/or physically interacting components and/or wirelessly interactable and/or wirelessly interacting components and/or logically interacting and/or logically interactable components.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. In addition, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to,"

"related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A computationally-implemented method, comprising:
acquiring an indication of a speech interaction between a particular party and a target device;
receiving, from a particular device associated with the particular party, an indication of a location on at least one server of adaptation data correlated to the particular party;
receiving, at the target device, the adaptation data correlated to the particular party from the location on the at least one server indicated by the particular device associated with the particular party;
processing speech from the particular party, received via the target device, at least partly using the adaptation data received from the at least one server device; and
updating the adaptation data on the at least one server based at least in part on a result of the processing speech from the particular party received via the target device.

2. The computationally-implemented method of claim 1, wherein said acquiring an indication of a speech interaction between a particular party and a target device includes:
acquiring an indication of an interaction in which the particular party interacts with the target device at least partly using speech and partly interacting with one or more portions of the target device.

3. The computationally-implemented method of claim 1, wherein said acquiring an indication of a speech interaction between a particular party and a target device includes:
acquiring an indication that the particular party is within a particular proximity of the target device.

4. The computationally-implemented method of claim 1, wherein said acquiring an indication of a speech interaction between a particular party and a target device includes:
acquiring an indication that the particular party is speaking to the target device.

5. The computationally-implemented method of claim 4, wherein said acquiring an indication that the particular party is speaking to the target device includes:
acquiring an indication that the particular party is speaking to the target device based on detection of one or more words spoken by the particular party.

6. The computationally-implemented method of claim 5, wherein said acquiring an indication that the particular party is speaking to the target device based on detection of one or more words spoken by the particular party includes:
acquiring an indication that the particular party is speaking to the target device based on detection of the particular party speaking a target sentence.

7. A computationally-implemented method comprising:
acquiring an indication that the particular party is speaking to a target device based on a position of a body part of the particular party;
receiving, from a particular device associated with the particular party, an indication of a location on at least one server of adaptation data correlated to the particular party;
receiving, at the target device, the adaptation data correlated to the particular party from the location on the at least one server indicated by the particular device associated with the particular party;
processing speech from the particular party, received via the target device, at least partly using the adaptation data received from the at least one server device; and
updating the adaptation data on the at least one server based at least in part on a result of the processed speech.

8. The computationally-implemented method of claim 7, wherein said acquiring an indication that the particular party is speaking to a target device based on a position of a body part of the particular party includes:
acquiring an indication that the particular party is speaking to the target device based on a position of a head of the particular party.

9. A computationally-implemented method comprising:
acquiring an indication that the particular party is speaking to the target device based on a position of an arm of the particular party;
receiving adaptation data correlated to the particular party from a location on at least one server specified by a particular device associated with the particular party;
processing speech from the particular party at least partly using the adaptation data received from the at least one server; and
updating the adaptation data on the at least one server based at least in part on a result of the processed speech.

10. The computationally-implemented method of claim 1, further comprising:
receiving adaptation data correlated to the particular party from the particular device.

11. The computationally-implemented method of claim 1, wherein said receiving, at the target device, the adaptation data correlated to the particular party from the location on the at least one server indicated by the particular device associated with particular party includes:
receiving adaptation data that includes at least one speech characteristic of the particular party, said receiving facilitated by a particular device associated with the particular party.

12. The computationally-implemented method of claim 1, wherein said receiving, at the target device, the adaptation data correlated to the particular party from the location on the at least one server indicated by the particular device associated with particular party includes:
receiving adaptation data that includes instructions for adapting one or more speech recognition components, said adaptation data received from a particular device associated with the particular party.

13. The computationally-implemented method of claim 1, wherein said receiving, at the target device, the adaptation data correlated to the particular party from the location on the at least one server indicated by the particular device associated with particular party includes:
receiving adaptation data that includes data linking pronunciation of one or more phonemes by the particular party to one or more concepts, said receiving facilitated by a particular device associated with the particular party.

14. The computationally-implemented method of claim 1, wherein said processing speech from the particular party, received via the target device, at least partly using the adaptation data received from the at least one server device includes:
applying the received adaptation data correlated to the particular party to the speech from the particular party.

15. The computationally-implemented method of claim 1, wherein said processing speech from the particular party, received via the target device, at least partly using the adaptation data received from the at least one server device includes:

applying the received adaptation data correlated to the particular party to a speech recognition component of the target device, wherein the received adaptation data includes a pronunciation dictionary.

16. The computationally-implemented method of claim 1, wherein said processing speech from the particular party, received via the target device, at least partly using the adaptation data received from the at least one server device includes:

processing received speech from the particular party at least partly using the received adaptation data correlated to the particular party.

17. The computationally-implemented method of claim 16, wherein said processing speech from the particular party, received via the target device, at least partly using the adaptation data received from the at least one server device includes:

processing received speech from the particular party at least partly using a received pronunciation dictionary correlated to the particular party.

18. The computationally implemented method of claim 17, wherein said processing speech from the particular party, received via the target device, at least partly using the adaptation data received from the at least one server device includes:

replacing a pronunciation definition of at least one word stored in a pronunciation dictionary of the target device with a corresponding pronunciation definition of at least one word stored in the received pronunciation dictionary; and processing the received speech using the pronunciation dictionary of the target device including the replaced pronunciation definition of the at least one word.

19. The computationally-implemented method of claim 1, wherein said updating the adaptation data on the at least one server based at least in part on a result of the processing speech from the particular party received via the target device includes:

updating the adaptation data based at least in part on a received result of the processed speech, such that the updated adaptation data is configured to be transmitted to the particular device.

20. The computationally-implemented method of claim 19, wherein said updating the adaptation data on the at least one server based at least in part on a result of the processing speech from the particular party received via the target device includes:

updating the adaptation data based at least in part on a received result indicating a subjective opinion of the particular party regarding a success of the speech-facilitated transaction.

21. A computationally-implemented method, comprising:
acquiring an indication of a speech interaction between a particular party and a target device;
receiving adaptation data correlated to the particular party, said receiving facilitated by a particular device associated with the particular party;
processing speech from the particular party, received via the target device, at least partly using the adaptation data received from the at least one server device; and
updating the adaptation data based at least in part on a received result of the processed speech indicating a subjective opinion of the particular party as a numerical representation of a success of the speech interaction, such that the updated adaptation data is configured to be transmitted to the particular device.

22. The computationally-implemented method of claim 21, wherein said updating the adaptation data based at least in part on a received result of the processed speech indicating a subjective opinion of the particular party as a numerical representation of a success of the speech interaction includes:

updating the adaptation data based at least in part on a received result indicating the particular party's numerical ranking of success of a speech interaction.

23. The computationally-implemented method of claim 1, wherein said updating the adaptation data on the at least one server based at least in part on a result of the processing speech from the particular party received via the target device includes:

updating the adaptation data based at least in part on a received result indicating a subjective state of the particular party after completing the speech interaction.

24. A computationally-implemented method comprising speech:

acquiring an indication of a speech interaction between a particular party and a target device;
receiving adaptation data correlated to the particular party from a location on at least one server specified by a particular device associated with the particular party;
processing speech from the particular party at least partly using the adaptation data received from the at least one server; and
updating the adaptation data based at least in part on a received result from a social network website indicating the particular party's subjective state after completing the speech interaction.

25. The computationally-implemented method of claim 23, wherein said updating the adaptation data based at least in part on a received result indicating a subjective state of the particular party after completing the speech interaction includes:

updating the adaptation data based at least in part on a received result from the particular device indicating the particular party's subjective state after completing the speech interaction.

26. The computationally-implemented method of claim 25, wherein said updating the adaptation data based at least in part on a received result from the particular device indicating the particular party's subjective state after completing the speech interaction includes:

updating the adaptation data based at least in part on a received result from the particular device indicating the particular party's subjective state inputted into the particular device by the particular party after completing the speech interaction.

27. A computationally-implemented method comprising speech:

acquiring an indication of a speech interaction between a particular party and a target device;
receiving adaptation data correlated to the particular party from a location on at least one server specified by a particular device associated with the particular party;
processing speech from the particular party at least partly using the adaptation data received from the at least one server; and
updating the adaptation data based at least in part on a received result from the particular device indicating the particular party's subjective state inputted into the particular device by the particular party after completing the speech interaction.

28. A computationally-implemented method, comprising:
acquiring an indication of a speech interaction between a particular party and a target device;
receiving, from a particular device associated with the particular party, an indication of a location on at least one server of adaptation data correlated to the particular party;
receiving, at the target device, the adaptation data correlated to the particular party, from the location on the at least one server indicated by the at least one other device associated with the particular party;
processing speech from the particular party, received via the target device, at least partly using the adaptation data received from the at least one server device;
requesting feedback from the particular party regarding a success of the speech interaction;
receiving feedback from the particular party regarding the success of the speech interaction; and
updating the adaptation data based at least in part on the feedback from the particular party.

29. The computationally-implemented method of claim 28, wherein said requesting feedback from the particular party regarding a success of the speech interaction includes:
transmitting a location at which feedback is requested from the particular party regarding a success of the speech interaction.

30. A computationally-implemented method, comprising:
acquiring an indication of a speech interaction between a particular party and a target device;
receiving adaptation data correlated to the particular party, said receiving facilitated by a particular device associated with the particular party;
processing speech from the particular party at least partly using the received adaptation data correlated to the particular party;
transmitting a world wide web address at which feedback is requested from the particular party regarding a success of the speech interaction;
receiving feedback from the particular party regarding the success of the speech interaction; and
updating the adaptation data based at least in part on a result of the processed speech.

31. The computationally-implemented method of claim 28, wherein said requesting feedback from the particular party regarding a success of the speech interaction includes:
sending a message to the particular device requesting feedback from the particular party regarding a success of the speech interaction.

32. The computationally-implemented method of claim 28, wherein said requesting feedback from the particular party regarding a success of the speech interaction includes:
transmitting a message configured to be presented on the particular device requesting feedback from the particular party regarding a success of the speech interaction.

33. The computationally-implemented method of claim 28, wherein said requesting feedback from the particular party regarding a success of the speech interaction includes:
sending a request to the particular device requesting presentation of a message requesting feedback from the particular party regarding a success of the speech interaction.

34. The computationally-implemented method of claim 28, wherein said receiving feedback from the particular party regarding the success of the speech interaction includes:
receiving feedback via the particular device regarding the success of the speech interaction.

35. The computationally-implemented method of claim 1, wherein said updating the adaptation data on the at least one server based at least in part on a result of the processing speech from the particular party received via the target device includes:
determining that the adaptation data should not be modified based at least in part on a result of the processed speech.

36. A computationally-implemented method comprising:
acquiring an indication of a speech interaction between a particular party and a target device;
receiving, from a particular device associated with the particular party, an indication of a location on at least one server of adaptation data correlated to the particular party;
receiving, at the target device, the adaptation data correlated to the particular party from the location on the at least one server indicated by the particular device associated with particular party;
processing speech from the particular party, received via the target device, at least partly using the adaptation data received from the at least one server device;
determining that the adaptation data should not be modified based at least in part on a result of the processed speech; and
transmitting, to the at least one server, an indication that a speech interaction has taken place and a determination that the adaptation data should not be modified has been made.

37. The computationally-implemented method of claim 1, wherein said updating the adaptation data on the at least one server based at least in part on a result of the processing speech from the particular party received via the target device includes:
updating the adaptation data based at least in part on a determined result of the processed speech.

38. The computationally-implemented method of claim 37, wherein said updating the adaptation data based at least in part on a determined result of the processed speech includes:
updating the adaptation data based at least in part on a result calculated by an inferred success of the speech interaction.

39. The computationally-implemented method of claim 38, wherein said updating the adaptation data based at least in part on a result calculated by an inferred success of the speech interaction includes:
updating the adaptation data based at least in part on a result calculated by an inferred success of the speech interaction, inferred from at least one characteristic of the received speech from the particular party.

40. The computationally-implemented method of claim 39, wherein said updating the adaptation data based at least in part on a result calculated by an inferred success of the speech interaction, inferred from at least one characteristic of the received speech from the particular party includes:
updating the adaptation data based at least in part on a result calculated by an inferred success of the speech interaction, inferred from a type of word used in the received speech from the particular party.

41. A computationally-implemented method comprising:
  acquiring an indication of a speech interaction between a particular party and a target device;
  receiving adaptation data correlated to the particular party from a location on at least one server specified by a particular device associated with the particular party;
  processing speech from the particular party, received via the target device, at least partly using the adaptation data received from the at least one server; and
  updating the adaptation data based at least in part on a result calculated by an inferred success of the speech interaction, inferred from a tone of voice used in the received speech from the particular party.

42. A computationally-implemented method comprising:
  acquiring an indication of a speech interaction between a particular party and a target device;
  receiving adaptation data correlated to the particular party from a location on at least one server specified by a particular device associated with the particular party;
  processing speech from the particular party, received via the target device, at least partly using the adaptation data received from the at least one server; and
  updating the adaptation data based at least in part on a result calculated by an inferred success of the speech interaction, inferred from a number of times a portion of the speech interaction was repeated.

43. The computationally-implemented method of claim 1, wherein said updating the adaptation data on the at least one server based at least in part on a result of the processing speech from the particular party received via the target device includes:
  updating the adaptation data based at least in part on a confidence rate of the processed speech.

44. The computationally-implemented method of claim 1, wherein said receiving, from a particular device associated with the particular party, an indication of a location on at least one server of adaptation data correlated to the particular party includes:
  receiving, from the particular device associated with the particular party, at least one of: an address, one or more credentials, one or more instructions, or an authorization.

* * * * *